(12) United States Patent  
Udeshi et al.

(10) Patent No.: US 9,097,552 B2  
(45) Date of Patent: Aug. 4, 2015

(54) ADAPTIVE CLUSTERING OF LOCATIONS

(71) Applicant: Google Inc., Mountain View, CA (US)

(72) Inventors: Tushar Jairaj Udeshi, Broomfield, CO (US); Dale Kris Hawkins, Erie, CO (US); Thomas Carl Stamm, Louisville, CO (US); Guang Yang, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/321,363

(22) Filed: Jul. 1, 2014

(65) Prior Publication Data

US 2014/0336926 A1    Nov. 13, 2014

Related U.S. Application Data

(63) Continuation of application No. 13/847,341, filed on Mar. 19, 2013, now Pat. No. 8,781,735.

(60) Provisional application No. 61/793,636, filed on Mar. 15, 2013, provisional application No. 61/664,149, filed on Jun. 25, 2012.

(51) Int. Cl.
```
G01C 21/26      (2006.01)
G01C 21/36      (2006.01)
G01C 21/30      (2006.01)
H04W 4/02       (2009.01)
```
(52) U.S. Cl.
CPC .............. *G01C 21/367* (2013.01); *G01C 21/26* (2013.01); *G01C 21/30* (2013.01); *H04W 4/023* (2013.01); *H04W 4/028* (2013.01)

(58) Field of Classification Search
USPC ........................................ 340/995.14–995.17
See application file for complete search history.

(56) References Cited

U.S. PATENT DOCUMENTS 7,751,971 B2   7/2010   Chang et al.
8,271,497 B2   9/2012   Ikenoue
(Continued)

FOREIGN PATENT DOCUMENTS

EP           1 480 011 A1    11/2004

OTHER PUBLICATIONS

International Preliminary Report on Patentability from International Application No. PCT/US2013/047651, mailed Jan. 8, 2015 7 pp.
(Continued)

*Primary Examiner* — Shelly Chen
(74) *Attorney, Agent, or Firm* — Shumaker & Sieffert, P.A.

(57) ABSTRACT

Example techniques and systems include generating cluster information to consolidate multiple locations. In one example, a method includes receiving, at a computing device, a plurality of location identifiers corresponding to a plurality of locations at which a mobile computing device was previously located, defining, by the computing device, a plurality of geographic regions based at least in part on the plurality of location identifiers, wherein each of the plurality of geographic regions defines a physical area in which at least one of the plurality of locations is located, selecting, by the computing device, a subset of the plurality of geographic regions based on respective distances between a current location of the mobile computing device and a respective reference point within each of the geographic regions, and outputting, by the computing device and for display, an indication of the subset of the plurality of geographic regions.

20 Claims, 9 Drawing Sheets

(56) References Cited

U.S. PATENT DOCUMENTS

| | | |
|---|---|---|
| 2004/0260465 A1 | 12/2004 | Tu |
| 2005/0177303 A1 | 8/2005 | Han |
| 2008/0133653 A1 | 6/2008 | Fok et al. |
| 2008/0248815 A1 | 10/2008 | Busch |
| 2010/0153292 A1 | 6/2010 | Zheng et al. |
| 2010/0211308 A1 | 8/2010 | Zheng et al. |
| 2011/0071881 A1 | 3/2011 | Zheng et al. |
| 2011/0208425 A1 | 8/2011 | Zheng et al. |
| 2011/0320450 A1 | 12/2011 | Liu et al. |
| 2012/0009946 A1 | 1/2012 | Wilson et al. |
| 2012/0058778 A1 | 3/2012 | Waters et al. |
| 2013/0345969 A1 | 12/2013 | Udeshi et al. |

OTHER PUBLICATIONS

International Search Report and Written Opinion of International application No. PCT/US2013/047651, mailed Sep. 19, 2013, 9 pp.

Prosecution History from U.S. Appl. No. 13/847,341 from Aug. 5, 2013 through Mar. 7, 2014 41 pp.

Examination Report from GB Application No. 1423360.5, issued Apr. 13, 2015 6 pp.

ADAPTIVE CLUSTERING OF LOCATIONS

This application is a Continuation of U.S. patent application Ser. No. 13/847,341, filed on Mar. 19, 2013, which claims the benefit of U.S. Provisional Patent Application No. 61/664,149, filed Jun. 25, 2012, and U.S. Provisional Patent Application No. 61/793,636, filed Mar. 15, 2013. The entire content of application Ser. Nos. 13/847,341, 61/664,149 and 61/793,636 are incorporated herein by reference.

BACKGROUND

A computing device (e.g., a mobile phone, tablet computer, smartphone, or notebook computer) may execute one or more applications configured to receive user input and/or display information viewable by a user. The computing device may provide geographic information such as a map or navigation instructions between two locations. The computing device may store data used to generate the geographic information and/or receive the data from a networked server via a network. The networked server may receive a location of the computing device and transmit a map of an area within which the computing device is positioned. The computing device may receive user input interacting with the map via a user interface of the computing device to request information about destinations (e.g., restaurants, libraries, hotels, etc.) or even navigation directions to a selected destination. In some cases, the computing device may present a large number of destinations for viewing by the user. The computing device may retrieve this requested information from the networked server via a network.

SUMMARY

In one example, a method includes receiving, at a computing device, a plurality of location identifiers corresponding to a plurality of locations at which a mobile computing device was previously located, defining, by the computing device, a plurality of geographic regions based at least in part on the plurality of location identifiers, wherein each of the plurality of geographic regions defines a physical area in which at least one of the plurality of locations is located, selecting, by the computing device, a subset of the plurality of geographic regions based on respective distances between a current location of the mobile computing device and a respective reference point within each of the geographic regions, and outputting, by the computing device and for display, an indication of the subset of the plurality of geographic regions.

In another example, a computing device includes one or more processors and a cluster module operable by the one or more processors to receive a plurality of location identifiers corresponding to a plurality of locations at which a mobile computing device was previously located, define a plurality of geographic regions based at least in part on the plurality of location identifiers, wherein each of the plurality of geographic regions defines a physical area in which at least one of the plurality of locations is located, determine respective distances between the mobile computing device and a respective reference point within each of the geographic regions, compare the distances between the current location of the mobile computing device and each of the respective reference points to a threshold, select at least a subset of the plurality of geographic regions, wherein each of the geographic regions of the subset have a distance greater than the threshold, and output, for display at a display device, the subset of the plurality of geographic regions.

In another example, a computer-readable storage medium is encoded with instructions that, when executed, cause one or more processors to receive a plurality of location identifiers corresponding to a plurality of locations at which a mobile computing device was previously located, determine a boundary of a geographic region based at least in part on a distance between the current location of the mobile computing device and a respective reference point within the geographic region, associate a respective location of the plurality of locations with the geographic region, wherein the respective location is located within the boundary of the geographic region, and output, for display at a display device, the geographic region.

The details of one or more examples are set forth in the accompanying drawings and the description below. Other features, objects, and advantages will be apparent from the description and drawings, and from the claims.

DETAILED DESCRIPTION

Figure 1:
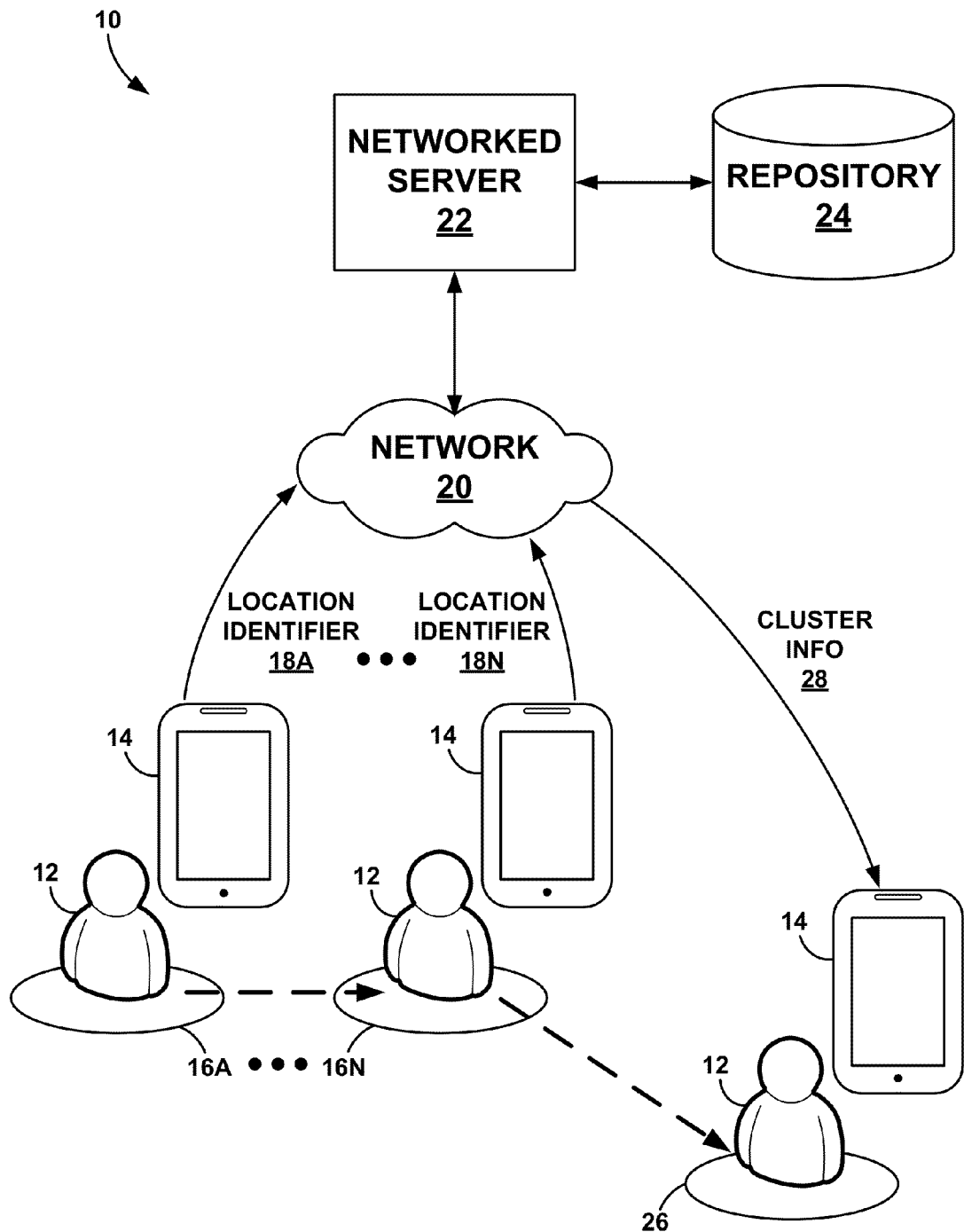
FIG. 1 is a conceptual diagram illustrating an example system that includes a computing device configured to transmit location identifiers and a server configured to generate and output cluster information for presentation by the computing device, in accordance with one or more aspects of the present disclosure.

In general, this disclosure is directed to techniques for clustering multiple location identifiers together based on a distance between a computing device and the locations of the respective location identifiers. For example, techniques of this disclosure may, in various instances, enable a computing device aggregate a plurality of physical locations into a defined cluster of physical locations (e.g., cluster information) and output, for display to a user, the cluster information instead of each of the individual locations that may be of interest to the user.

The cluster information may include geographic regions (e.g., clusters) that each represent a plurality of individual locations. Since presentation of each of the individual locations may be overwhelming or impractical for a typical user to digest, the geographic regions may represent various groups of locations based on proximity to each other. The geographic regions may, for example, simplify travel planning and/or navigation to each area that includes several different individual locations. For example, each presented geographic region may include an estimated travel time to a reference point within the region to represent an approximate travel time to any of the locations within the geographic region. In another example, the user may request navigation directions to one of the presented geographic regions instead of a specific location within the region. In response to receiving the user request for navigations directions to one of the presented geographic regions, the computing device may output, for presentation at a display, the geographic regions as a list and/or in graphical form over a map.

The computing device and/or networked server may be configured to adaptively relate the location identifiers (e.g., update the geographic regions or adaptively cluster the location identifiers) based on the respective distances between the current location of the computing device and the respective locations within the geographic regions. As the user is traveling and the computing device is moving with respect to the geographic regions, a computing device may update or redefine the geographic regions to provide more relevant geographic regions to the user. The computing device may receive indications of user selections of the displayed updated geographic regions to refine the navigation directions or further identify the final destination desired by the user. For example, as the computing device gets closer to a selected geographic region, the computing device or networked server may split the selected geographic region into multiple geographic regions that, as a whole, may include at least some (or all) of the same locations that the selected geographic region included prior to being split. The multiple geographic regions may be smaller in size and/or include fewer locations than the previous geographic regions.

In some examples, a networked server may define all of the geographic regions or clusters based on past user locations, predicted locations of interest to the user, or any combination thereof. Using the defined geographic regions, the networked server may select a subset of the geographic regions for presentation on the computing device. The selected subset of geographic regions may be based on the distance between the computing device and each of the defined geographic regions. For example, the networked server may be configured to select, as part of the subset, geographic regions having a distance greater than a threshold distance from the computing device. In this manner, the networked server may be output, for display, geographic regions at least a certain distance away from the computing device. For example, if the computing device is located close to or within a geographic region, the networked server may output individual locations instead of the respective geographic regions because navigation to individual locations would be more relevant than navigation to a reference point within the geographic region at these shorter distances. When the computing device moves, the networked server may select a new subset of geographic regions based on updated distances between an updated location of the computing device and a reference point of each region.

In another example, the networked server may define the geographic regions on demand as the computing device moves with respect to the locations that may be included in each region. The networked server may determine a boundary of each geographic region based on the distance between the computing device and a reference point within each region. For example, the networked server may update the boundary to reduce the size of the geographic region as the computing device moves closer to the geographic region. When the size of the geographic region decreases, fewer locations may fall within the region. Therefore, the networked server may also add geographic regions to represent the same number of locations as the computing device nears the respective locations. In other examples, the server may define geographic regions to maintain a fractional radius or size of the regions with respect to the distance between the computing device and the locations.

In the examples described herein, the networked server and/or computing device may adaptively define geographic regions, or clusters, to include stored location identifiers representing locations of interest to a user. These locations may be previously visited places by the user and/or predicted places of interest based on the visited places and/or information provided by the user (e.g., internet sites visited, previous map searches, or email information). The networked server and/or computing device may continually update clusters (i.e., the geographic regions) to provide possible areas of interest to the user without overpopulating the user interface with possible individual locations. These geographic regions may streamline and facilitate use of predictive locations for the user.

FIG. 1 is a conceptual diagram illustrating an example system 10 that includes a computing device 14 configured to transmit location identifiers 18A though 18N (collectively "location identifiers 18") and server 22 configured to generate and output cluster information 28 for presentation by computing device 14. As shown in FIG. 1, system 10 includes computing device 14, network 20, networked server 22, and repository 24. Computing device 14 may be carried or otherwise associated with user 12, and user 12 may have resided at various locations 16A and 16N (collectively "locations 16") and present at location 26.

Computing device 14, in some examples, is or is a part of a portable or mobile computing device (e.g., a mobile phone, a netbook, a notebook, or a tablet device). In other examples, computing device 14 may include or be a part of a digital camera, a music player, a navigation device, or any other computing device that a user may carry or move between different locations. Computing device 14 may also connect to network 20 (e.g., a wired or wireless network). Although network 20 may be a single network, network 20 may be representative of two or more networks that allow computing device 14 to communicate with networked server 22.

Computing device 14 may include a user interface (not shown) that includes one or more input devices and/or output devices so that the user can communicate with computing device 14. In one example, the user interface may be a touch screen interface. In some examples, the user interface may include a display and one or more buttons, pads, joysticks, mice, tactile device, or any other device capable of turning user actions into electrical signals that control computing device 14. In any example, the user may interact with the user interface to provide input prior to or during the processes described herein.

Computing device 14 may also include a network interface (shown in FIG. 2) and other hardware that facilitates communication with network 20. As described herein, computing device 14 may be configured to upload or transmit location identifiers 18 as a representation of respective locations 16 at which computing device 14 and user 12 have resided over time. For example, user 12 may carry computing device 14 as user 12 travels between various locations 16. User 12 may travel for business and/or personal reasons to a variety of different locations 16. Locations 16 may be destinations such as restaurants, stores, libraries, workplaces, parks, recreation facilities, schools, or any other places that user 12 may visit.

Over time, user 12 may travel between multiple different locations 16. In one example, user 12 may visit location 16A, location 16N, and one or more locations in between. Locations 16 may include a few locations or as many as hundreds or even thousands of locations. Computing device 14 may continually be detecting the location of computing device 14 and transmitting the locations as a respective location identifier 18. When user 12 carries computing device 14 to location 16A, computing device 14 may generate and transmit location identifier 18A to networked server 22 via network 20. When user 12 moves to another location, such as location 16N, computing device 14 may generate and transmit location identifier 18N to networked server 22 via network 20. Computing device 14 may continually generate and transmit location identifiers 18 to network sever 22 as user 12 moves between various locations 16.

Networked server 22 may use location identifiers 18 to generate and/or store a location history of user 12. In some examples, different computing devices may transmit location identifiers 18 for the same user 12 when the respective computing device is associated with user 12. In this manner, location identifiers 18 generated and transmitted to networked server 22 from computing devices previously associated with user 12, or each of several computing devices, carried by user 12 may be maintained by networked server 22 and repository 24. Location identifiers 18 may be associated with user 12 when user 12 is logged into an application of computing device 14 or listed as the user of computing device 14. Networked server 22 may maintain the associations between users and computing devices.

Computing device 14 may generate location identifiers 18 using one or more techniques. For example, computing device 14 may use a global positioning system (GPS) device to obtain latitude and longitude coordinates of computing device 14. In another example, computing device 14 may derive its position using one or more network access points (e.g., wireless towers or local area network access devices) to which computing device 14 is connected. In another example, computing device 14 may determine its position by recognizing other computing devices using short-range communication or other communication protocols. In any case, each of location identifiers 18 may be generated for a respective location 16 at which user 12 and associated computing device 14 resided. Computing device 14 may generate each location identifier 18 using one or more of these or other position detecting techniques.

In one example, computing device 14 may generate a location identifier 18 when the position of computing device 14 has not changed for a predetermined period of time (e.g., a predetermined number of seconds, minutes, or hours). In another example, computing device 14 may generate a location identifier 18 when the position of computing device 14 remains within a predetermined area (e.g., an area of predetermined size) for a predetermined period of time. These time-based thresholds may be implemented to reduce the number of transitory location identifiers 18 generated when user 12 is still traveling and not at any particular destination. In other examples, location identifiers 18 may be generated when computing device 14 receive input that may indicate user 12 has arrived at a destination (e.g., computing device 14 receives an input checking-in user 12 at a particular destination).

Each of location identifiers 18 may include some data representative of the respective location 16 at which the location identifier was generated. For example, location identifiers 18 may include one or more GPS coordinates, distance and direction from a known location, and/or a known landmark for which networked server 22 may derive the position of the landmark. Networked server 22 may store each of the received location identifiers 18 in repository 24. Networked server 22 may format each of location identifiers 18 into a predetermined format prior to or after storing each location identifier in repository 24. Networked server 22 may then analyze received location identifiers 18 to generate location history of user 12, identify frequently visited locations of user 12, predict locations of interest to user 12, and/or provide cluster information 28 to user 12. Cluster information 28 is described in more detail below and may be provided to computing device 14 as a navigational or traveling tool for user 12, for example.

When user 12 is positioned at location 26, location 26 may be a destination or some area different to other previously visited locations 16. However, user 12 may desire to travel back to one of locations 16 or similarly positioned location. Cluster information 28 generated by networked server 22 and transmitted to computing device 14 may facilitate user 12 travel or navigation based on the previously transmitted location identifiers 18. As will be further described below, cluster information 28 may include geographic regions that each include two or more location identifiers 18 and/or suggested locations. Each of the geographic regions, or cluster, may consolidate a plurality of locations such that computing device 14 may present the geographic regions instead of each individual location identifier 18 and/or suggested locations. Computing device 14 may then present fewer items (e.g., geographic regions representing similarly positioned locations) instead of many individual items that may overwhelm user 12.

Networked server 22 may be associated with an operating system of computing device 14 and/or a mapping service configured to generate cluster information 28. Although cluster information 28 may be generated by network 22, some or all of cluster information 28 may be generated by computing device 14 in other examples. In this manner, tasks associated with generating cluster information 28 may be performed by one device or distributed between multiple devices. As user 12 continues to travel to different locations 16 or 26, computing device 14 may continue to generate and transmit location identifiers 18 and, in some cases, receive updated cluster information 28.

Networked server 22 may include one or more desktop computers, mainframes, minicomputers, or other computing devices capable of executing computer instructions and storing data. Networked server 22 may include any hardware and software that enables networked server 22 to generate cluster information such as geographic regions, information about each geographic region, and/or navigation directions from computing device 14 to a selected region. Repository 24 may include one or more memories, repositories, hard disks, or any other data storage device. In some examples, repository 24 may be included within networked server 22. Network 20 may be a high-speed network (e.g., a WiFi, WiMax, wireless local area network, 3G, 4G, etc.) or another wireless network (e.g., a cellular or other data network). In some examples, network 20 may be embodied as one or more of the Internet, a wired network, or a fiber optic network. In other words, network 20 may be any data communication protocol or protocols that facilitate data transfer between two or more devices.

Repository 24 may be included in, or described as, cloud storage. In other words, location identifiers 18, cluster information 28, and/or instructions that embody the techniques described herein may be stored in one or more locations in the cloud (e.g., one or more repositories 24). Networked server 22 may access the cloud and retrieve the desired data as requested by an authorized user, such as computing device 14.

In some examples, repository 24 may include Relational Database Management System (RDBMS) software. In one example, repository 24 may be a relational database and accessed using a Structured Query Language (SQL) interface that is well known in the art. Repository 24 may alternatively be stored on a separate networked computing device and accessed by networked server 22 through a network interface or system bus. Repository 24 may in other examples be an Object Database Management System (ODBMS), Online Analytical Processing (OLAP) database or other suitable data management system.

To facilitate the connection with networks and access-points to the media sharing service, computing device 14 may include a short-range communication module capable of communicating with various devices. Example short-range communication devices may include Bluetooth, WiFi, near field communication (NFC), or any other similar technology. The maximum distance between computing device 14 and the other device (e.g., the vicinity or envelope surrounding computing device 14) may be at least partially determined by the type of short-range communication used for the detection. In some instances, the maximum distance may be between approximately one meter and 100 meters. In one example, the maximum distance for the detection may be approximately 10 meters.

As described herein, cluster information 28 may be used to facilitate user travel or navigation to one or more desired places. Alternatively, cluster information 28 may be used to plan future events, itineraries, or otherwise review potential places to visit without search or scanning hundreds or thousands of places. Cluster information 28 may include one or more geographic regions that may group or associate location identifiers 18 or other suggested locations by proximity of the locations to each other. In other words, each geographic region may be defined at least in part by a boundary within which the associated locations reside. A cluster module of computing device 14, a cluster module of networked server 22, one or more processors, and/or other modules may provide the functionality of system 10.

In one example, a cluster module of networked server 22 may receive location identifiers 18 each of which corresponds to a respective location 16 at which at least one mobile computing device associated with user 12 was previously located. The cluster module may then define a plurality of geographic regions based at least in part on the received location identifiers 18. Each of the plurality of geographic regions may define a physical area in which at least one of locations 16 is located, represented by location identifiers 18. In other examples, each of the plurality of geographic regions may define a physical area in which at least two of locations 16 are located, represented by location identifiers 18. A location 16, represented by location identifier 18, may be included in a geographic region when the location is located within the boundary (e.g., a geographic boundary) of the respective geographic region. In some examples, one location 16 may be within or included in multiple geographic regions. The cluster module may also select at least a subset of the plurality of geographic regions based on respective distances between computing device 14 associated with user 12 and a reference point within each of the geographic regions. Once the subset of geographic regions are selected, the cluster module may be configured to output the subset of the plurality of geographic regions (e.g., cluster information 28) for presentation at a display of computing device 14.

Computing device 12 may include a user interface that includes a display configured to present visual information to user 12. The display may present at least one of graphical or textual representations of the geographic regions. For example, the display may present a textual list of the geographic regions. The list of geographic regions may be ordered by increasing or decreasing size, diameter, or area. In another example, the display may present a graphical representation in the form of visual representations of the geographic regions over a map or other layer indicating the relative spacing between each of the geographic regions. For example, computing device 14 may present an interactive map with one or more of the geographic regions overlaid on the map. The user interface may present a button or other input that allows user 12 to toggle between the textual and graphical representations of the geographic regions or otherwise change the format of the geographic regions. Computing device 12 may also receive a user selection of one of the geographic regions to view included locations, retrieve navigation directions to the selected region, or any other functions.

In another example, computing device 14 may be configured to present the geographic regions with respective distances between computing device 14 and the respective reference point within each of the geographic regions. The reference point may be the center of the region, a weighted center based on locations within the region, a representative location within the region, or any other point that may be used to define distances and/or navigation directions to the geographic region.

Networked server 22 and/or computing device 12 may also provide estimated travel times from computing device 14 to one or more of the geographic regions. For example, networked server 22 (e.g., the cluster module or another processor or software module) may calculate the estimated travel time based on the respective distances between computing device 14 and the reference point within each of the geographic regions. The estimated travel time may also be based on travel delay information associated with a travel path between computing device 14 and the reference points. In other words, networked server 22 may utilize real-time traffic information on roads and/or public transportation information to estimate the travel time for user 12 to reach the reference point of the geographic region. The estimated travel time may be provided for each of the geographic regions when presented to user 12 or after user 12 has selected a specific geographic region. Networked server 22 and/or computing device 14 may thus output, for presentation at the display of computing device 14, the estimated travel time (or an indication of the estimated travel time) for each of the geographic regions.

Networked server 22, for example, may also provide navigation directions to a selected geographic region. Networked server 22 may receive a selection of one of the geographic regions of the subset presented by computing device 13 and receive a current location of computing device 14. Using this information and navigation algorithms, networked server 22 may be configured to calculate navigation directions from the current location (e.g., location 26) of computing device 14 to the reference point of the selected geographic region. Networked server 22 may then output, for presentation at the display of computing device 14, the navigation directions for the geographic region (or an indication of the navigation directions). Computing device 14 may then receive the navigation directions and display the direction to user 12. During navigation to the selected geographic region, computing device 14 may present additional geographic regions. These geographic regions may be smaller regions than the previously selected region as user 12 approaches the selection region. Upon receiving a selection of a different geographic region, computing device 12 may transmit the selection to networked server 22, networked server 22 may generate new navigation directions to the newly selected region, and networked server 22 may output the new navigation directions to computing device 14.

The geographic regions, or clusters, selected for presentation to user 12 via computing device 14 may change as computing device 14 moved to different locations. In other words, the distance between computing device 14 may change and the geographic regions that are selected may adapt to the changing distances. For example, networked server 22 may determine that the respective distances between computing device 14 and the geographic regions has changed. This determination may be made based on a change to the detected location of computing device 14 or the monitoring of one or more distances to geographic regions. In response to the determination, networked server 14 may calculate updated distances between computing device 14 and each of the geographic regions. Networked server 22 may then select a second subset of the plurality of geographic regions based on the updated distances between computing device 14 and the respective reference point within each of the geographic regions. Networked server 22 may then output the second subset of the plurality of geographic regions for presentation at the display of computing device 14. This updating of selected geographic regions may continue as computing device 14 moves and/or a software application presenting the geographic regions is open or active.

In some examples, one or more functions described herein may be performed at a cluster module of computing device 14. For example, cluster information 28 may include all geographic regions defined by networked server 22. A cluster module of computing device 14 may then select the subset of geographic regions based on the respective distances. In this manner, since computing device 14 may detect the position of computing device 14, computing device 14 may calculate the respective distances and select the appropriate geographic regions without networked server 22 interaction. Selection of the subset of geographic regions by computing device 14 may limit data transfer necessary when computing device 12 is moving and the selected subset of geographic regions may need to be updated due to changing distances.

The current location of computing device 14 may be obtained or detected using GPS coordinates, detected cell towers, or any other technique known in the art. The distance between computing device 14 and each of the geographic regions may be performed by calculating the distance from computing device 14 to a referent point within each of the geographic regions. The reference point may be near the center of the region or even the closest edge of the boundary of the region. In addition, the distance may be calculated in a straight line between computing device 14 and the reference point of each region. In other examples, the distance may be calculated as a traveling distance such as the distance using public roads or accessible areas to reach each reference point from computing device 14.

Networked server 22 may select the subset of geographic regions to be presented to user 12 using different techniques. In one example, networked server 22 may compare the distance between computing device 14 and the reference point for each of the geographic regions to a threshold (e.g., a distance threshold). Networked server 22 may then select, for the subset, geographic regions having a distance greater than the threshold. The threshold may be a predetermined distance selected to prevent geographic regions too close to computing device 14 from being presented to user 12. In other words, geographic regions very close to computing device 14 may be deemed to not be helpful to user 12. Instead, computing device 14 may present individual locations, or no locations, to user 12 when the distance is less than the threshold. In this manner, networked server 22 or computing device 14 may identify geographic regions having a distance less than the threshold and output, for presentation at the display of computing device 14, individual location identifiers 18 or locations located within the identified geographic regions.

Generally, the distance threshold may be between approximately 500 meters and 50 kilometers. In one example, the threshold may be between approximately 1,000 meters and 20,000 meters. In a specific example, the threshold may be approximately 10,000 meters. Shorter or longer thresholds may be used in other examples. In some examples, the threshold may be dynamic and selected based on user preferences, the number of locations used to define the geographic regions, and/or the size of each geographic region. For example, larger geographic regions may be need to be further from computing device 14 to be included in the subset of geographic regions presented to user 12.

In addition to, or instead of, the threshold indicated above, the subset of geographic regions may be selected using a region metric. For example, networked server 22 may, for each of the geographic regions, calculate a radius of the geographic region. In other examples, a diameter or area may be calculated and utilized instead. For each of the geographic regions, networked server 22 may calculate a region metric by dividing the radius by the distance between computing device 14 and the geographic region. The region metric may be an indication of the relative size of the geographic region to the distance computing device 14 is from the geographic region. Networked server 22 may then compare the region metric to a metric threshold and select, for the subset, geographic regions with the respective region metric greater than the metric threshold.

Comparing the region metric to the metric threshold may be used to ensure that the selected geographic regions are relevant to user 12 based on the distance computing device 14 is to the geographic region and how large the region is. For example, a geographic region with a small radius that is far from computing device 14 may have a smaller region metric and not be greater than the metric threshold. These smaller regions may thus not be selected for presentation to user 12 because larger geographic regions may be more helpful to the user for the long distance the user is from the region. When networked server 22 applies both of the distance threshold and the metric threshold to the geographic regions, large geographic regions too close to computing device 14 may be rejected and small geographic regions too far from computing device 14 may be rejected from inclusion in the presented subset of geographic regions.

Generally, the metric threshold may be between approximately 0.05 and 0.5. In one example, the metric threshold may be between approximately 0.1 and 0.3. In one example, the metric threshold may be approximately 0.2. Other examples of the metric threshold may include smaller or larger thresholds. In addition, the metric threshold may be predetermined or selected based on input provided to computing device 14 by user 12.

In some examples, the geographic regions may be defined based on location identifiers 18 and/or suggested locations. The geographic regions may not be based on the current position or location 26 of computing device 14. In this manner, different subsets of geographic regions may be selected from the same set of geographic regions based on changing distances between computing device 14 and the geographic regions. In other examples, the geographic regions may be defined by determining a boundary of each of the geographic regions based at least in part on respective distances between computing device 14 and the reference point within each of the geographic regions.

When networked server 22 determines the boundary of each of the geographic regions to define each geographic region, networked server 22 may adjust the radius, diameters, or area of the geographic regions such that location identifiers 18 are split into a greater number of geographic regions when computing device 14 is closer to the location identifiers. In this manner, networked server 22 may also adaptively determine the number of geographic regions in addition to the boundaries of each region. For example, a set ratio of distance to region radius may be used to dynamically adjust the boundary of each geographic region. In one example, the size or area of the one or more geographic regions may decrease with decreasing distance between computing device 14 and the one or more geographic regions. Conversely, the size or area of the one or more geographic regions may increase with increasing distance between computing device 14 and the one or more geographic regions.

If a region increases in size such that two regions overlap with each over, networked server 22 may combine the location identifiers 18 of both overlapping regions into a single region with a larger radius or boundary. If a region decreases in size such that one or more location identifiers 18 are no longer within the boundary, networked server 22 may add an additional geographic region to include the location identifiers. After the boundaries are determined, networked server 22 may associate at least one location of the plurality of locations with a respective one of the geographic regions when the at least one location is within the boundary of the respective geographic region. This dynamic determination of region boundaries may be performed separate from using the distance threshold and/or metric threshold to select geographic regions. In other examples, the distance and metric thresholds may be used in conjunction with determining geographic region boundaries based on the distance between the regions and computing device 14.

The boundaries may also be changed when computing device 14 moves or changes locations. For example, networked server 22 may determine that the distances between computing device 14 and the geographic regions has changed and calculate updated distances between computing device 14 and each of the geographic regions. Networked server 22 may then update at least one of the size of the one or more geographic regions based on the updated distances and a number of the one or more geographic regions based on the updated distances. Networked server 22 may then associate locations 16, suggested locations, and/or location identifiers 18 within each of the one or more updated geographic regions with the respective geographic region.

As described herein, geographic regions may be defined based on location identifiers 18 generated by computing device 14 (or another computing device associated with user 12). Location identifiers 18 may represent a location history of user 12. In some examples, the frequency with which similar location identifiers 18 are received by networked server 22 may enable networked server 22 to identify frequently visited places or most recently visited places. Thus all or only some of location identifiers 18 may be used to define geographic regions and generate cluster information 28. These frequently visited places, or the total location identifiers 18, may be used to define the geographic regions.

Alternatively, or in addition, other locations may be used to predict where user 12 may like to travel. These suggested locations may be determined based on location identifiers 18, locations obtained from similar users, popular locations as determined from other users, search engine search information provided by user 12, scheduled appointments in a calendar maintained by computing device 14, or any other information. One or more of the selected geographic regions may then include one or more suggested locations that user 12 has not yet visited. In one example, networked server 22 may thus define at least one of the geographic regions based on a respective location of at least one suggested destination, and wherein the at least one suggested destination is based on the plurality of locations. The number or frequency of suggested locations used in the geographic regions may be set based on requests from user 12 to include or exclude suggested locations within the geographic regions.

Networked server 22 is generally described as a computing device configured to perform various functions such as defining a plurality of geographic regions based at least on location identifiers 18 and selecting a subset of the plurality of geographic regions based on respective distances between a current location of a mobile computing device (e.g., computing device 14) and a respective reference point within each of the geographic regions. However, in other examples, computing device 14 may perform one or more of the functions attributed to networked server 22 herein. For example, computing device 14 may be configured to receive location identifiers 18, define geographic regions based on location identifiers 18, select a subset of the plurality of geographic regions based on the respective distances between a current location of computing device 14 and respective reference points within each of the geographic regions, and output the selected subset of geographic regions for display (e.g., display at a display device of computing device 14). In this manner, computing device 14 may be configured to perform some or all of the functions and techniques described herein.

Generally, computing device 14 is described as a mobile computing device or another device or system that includes various components such as the components described below with respect to computing device 14 in FIG. 2. However, in some examples, one or more processors may be described as a computing device and perform some or all of the functions attributed to computing device 14. In one example, the one or more processors may be described as a computing device with a larger system of a mobile computing device such as a smartphone or smartwatch. In another example, the computing device may be one or more processors as a part of a networked device, such as networked server 22. In this manner, a computing device, as described herein, may describe one or more processors of a larger device of system (e.g., a mobile computing device or networked server), a mobile computing device, a remote computing device, or a networked server, as some examples.

Various aspects of the disclosure may be operable only when the user has explicitly enabled such functionality. For example, in the instance where the user has consented to the use of any data, e.g., collection and/or transmission of location identifies, the data may be used to cluster information and/or provide locations of interest to the user. The user may consent or revoke consent to the collection and/or transmission of any data at any time. In addition, various aspects of the disclosure may be disabled by the user. Thus, a user may elect to prevent computing device 14 from collection and/or transmitting location identifiers 18 or any other information related to the location of where the user resides or to where the user travels. In addition, the user may prevent computing device 14 from transmitting information identifiable of the user without confirmation. Computing device 14 may present one or more screens requesting that the user elect to transmit any or all information. In this manner, the user may control what information, if any, is transmitted to server 22. More generally, privacy controls may be applied to all aspects of the disclosure based on a user's privacy preferences to honor the user's privacy preferences related to the use of computing device 14 or any other computing device or functionality described in this disclosure.

Figure 2:
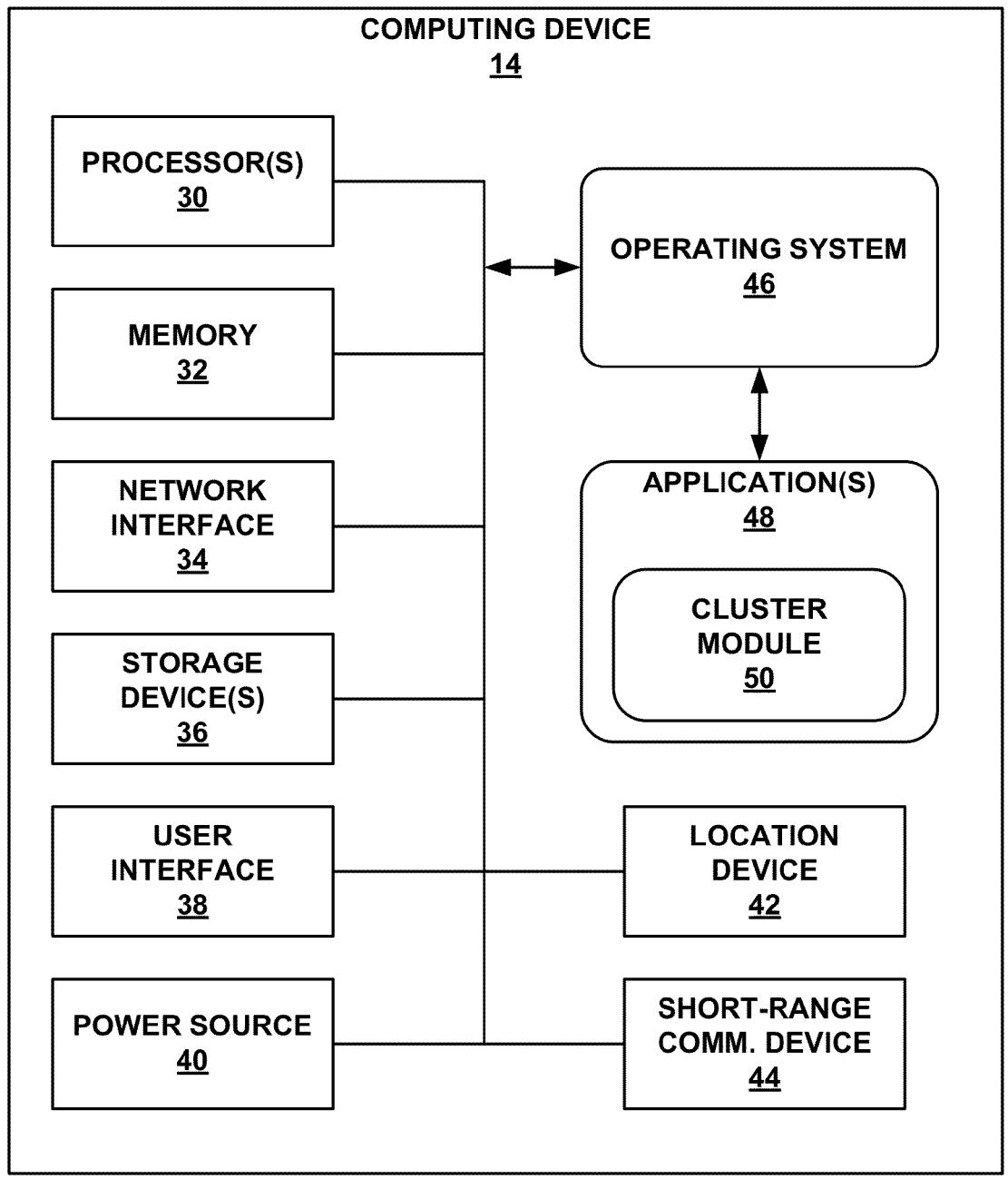
FIG. 2 is a block diagram illustrating components of one example of the computing device shown in FIG. 1.

FIG. 2 is a block diagram illustrating components of one example of computing device 14. FIG. 2 illustrates only one particular example of computing device 14, and many other example embodiments of computing device 14 may be used in other instances. For example, computing device 14 may include additional components and run multiple different applications.

As shown in the specific example of FIG. 2, computing device 14 includes one or more processors 30, memory 32, a network interface 34, one or more storage devices 36, user interface 38, power source 40, location device 42, and short-range communication device 44. Computing device 14 also includes an operating system 46, which may include modules and/or applications that are executable by processors 30 and computing device 14, such as cluster module 50. Computing device 14, in one example, further includes one or more applications 48. One or more applications 48, such as cluster module 50, are also executable by computing device 14. Each of components 30, 32, 34, 36, 38, 40, 42, 44, 46, 48, and 50 may be interconnected (physically, communicatively, and/or operatively) for inter-component communications.

Processors 30, in one example, are configured to implement functionality and/or process instructions for execution within computing device 14. For example, processors 30 may be capable of processing instructions stored in memory 32 or instructions stored on storage devices 36. These instructions may define or otherwise control the operation of operating system 46 and application 48. In some examples, one or more of processors 30 may be described as a separate computing device within computing device 14. In this manner, one or more of processors 30 may perform some or all of the functions described herein with respect to computing device 14 and/or other computing devices. Application 48, such as cluster module 50 may control the transmission of location identifiers 18, some or all of generating cluster information 28, and/or the selection of the subset of geographic regions to be presented to user 12. In other examples, multiple applications 48 may control the processes described herein such that each application controls one or more aspect of the entire process (e.g., one application may control generation of location identifiers 18, one application may control transmission of location identifiers 18, and one application such as cluster module 50 may control the presentation and/or selection of geographic regions). Cluster module 50 may perform some or all of the functions described herein and attributed to networked server 22. Alternatively, networked server 22 may perform all functions related to defining and selecting geographic regions without any need for cluster module 50.

Memory 32, in one example, is configured to store information within computing device 14 during operation. Memory 32, in some examples, is described as a computer-readable storage medium. In some examples, memory 32 is a temporary memory, meaning that a primary purpose of memory 32 is not long-term storage. Memory 32, in some examples, is described as a volatile memory, meaning that memory 32 does not maintain stored contents when the computer is turned off. Examples of volatile memories include random access memories (RAM), dynamic random access memories (DRAM), static random access memories (SRAM), and other forms of volatile memories known in the art. In some examples, memory 32 is used to store program instructions for execution by processors 30. Memory 32, in one example, is used by software or applications running on computing device 14 (e.g., one or more of applications 48) to temporarily store information during program execution.

Storage devices 36, in some examples, also include one or more computer-readable storage media. Storage devices 36 may be configured to store larger amounts of information than memory 32 (e.g., cluster information 28 and/or location identifiers 18). Storage devices 36 may further be configured for long-term storage of information. In some examples, storage devices 36 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 14, in some examples, also includes a network interface 34. Computing device 14, in one example, utilizes network interface 34 to communicate with external devices via one or more networks, such as network 20 in FIG. 1. Network interface 34 may be a network interface card, such as an Ethernet card, an optical transceiver, a radio frequency transceiver, or any other type of device that can send and receive information. Other examples of such network interfaces may include Bluetooth, 3G, 4G, and WiFi radios in mobile computing devices as well as USB. In some examples, computing device 14 utilizes network interface 34 to wirelessly communicate with external devices (e.g., networked server 22) such as a server, mobile phone, or other networked computing device. As described herein, network interface 34 may be configured to transmit location identifiers 18 and receive cluster information 28 over network 20 as instructed by applications 48 and/or processors 30.

Computing device 14, in one example, also includes one or more user interfaces 48. User interface 38 may be configured to receive input from a user (e.g., tactile, audio, or video feedback). User interface 38 may include a touch-sensitive and/or a presence-sensitive input device (e.g., a screen), mouse, a keyboard, a voice responsive system, or any other type of device for detecting a command from a user. User interface 38 may also include, combined or separate from input devices, output devices. In this manner, user interface 38 may be configured to provide output to a user using tactile, audio, or video stimuli. In one example, user interface 38 may include a touch-sensitive display device, sound card, a video graphics adapter card, or any other type of device for converting a signal into an appropriate form understandable to humans or machines. In addition, user interface 38 may include a speaker, a liquid crystal display (LCD), light emitting diode (LED) array, or any other type of device that can generate intelligible output to a user. In this manner, user interface 38 may include one or more output devices (e.g., a display device) and/or one or more input devices (e.g., a presence-sensitive input device). When input and output devices are combined together, user interface 38 may be described as a presence-sensitive display device, for example.

Computing device 14 may also include one or more short-range communication devices 44. Short-range communication device 44 may include one or more modules configured to communicate via Bluetooth, WiFi, Ultra-Wideband radio or NFC, for example. Processors 30 may control short-range communication device 44 to detect third-party computing devices or any other device capable of communication with computing device 14. In some examples, computing device 14 may be configured to utilize short-range communication device 44 to detect the location of computing device 14 and generate location identifiers 18.

Computing device 14 may also include one of more location device 42. Location device 42 may include one or more satellite radios (e.g., a global positioning system (GPS) radio) capable of determining the geographic location of computing device 14. Computing device 14 may utilize location device 42 to confirm the location of the computing device 14, identify which networks may be available to computing device 14, or determine the location of computing device 14 from such networks or network towers. Alternatively, location device 42 may utilize triangulation or other such techniques to determine the location of computing device 14 based on known geographic positions of network towers, network access points, or any other device that may communication with computing device 14.

Computing device 14, in some examples, includes one or more power sources 40 such as a rechargeable battery that may provide power to computing device 14. Power sources 40, in some examples, may be made from nickel-cadmium, lithium-ion, or other suitable materials. In other examples, power sources 40 may be capable of providing stored power or voltage from another stored energy (e.g., fuel cells or capacitors).

Computing device 14 may also include operating system 46. Operating system 46, in some examples, controls the operation of components of computing device 14. For example, operating system 46, in one example, facilitates the interaction of application 48 with processors 30, memory 32, network interface 34, storage device 36, user interface 38, short-range communication device 44, and location device 42.

Application 58 may be a software and/or hardware module that controls generation and transmission of location identifiers 18 and/or the definition, selection, and/or presentation of geographic regions. Applications 48, such as cluster module 50, may provide commands to processors 30 to control any of the components of computing device 14 as needed during any aspect of the process. Although applications 48 may be software independent from operating system 46, applications 48 may be a sub-routine of operating system 46 in other examples. Applications4 may also include sub-modules that execute various aspects of the posting and transmission process. In some examples, the user may be required to initiate applications 48 by selecting the application from a list of applications stored on computing device 14. Alternatively, applications 48 may automatically launch cluster module 50 upon opening a map application or server or upon determining that computing device 14 is moving.

Computing device 14 may include additional components or sensors to perform functionality described herein. For example, computing device 14 may include one or more accelerometers to detect accelerations of computing device 14 that may indicate computing device 14 is moving. Any applications or modules (e.g., applications 48) implemented within or executed by computing device 14 may be implemented or contained within, operable by, executed by, and/or be operatively/communicatively coupled to components of computing device 14 (e.g., processors 30, memory 32, network interface 34, and/or storage devices 36).

Figure 3:
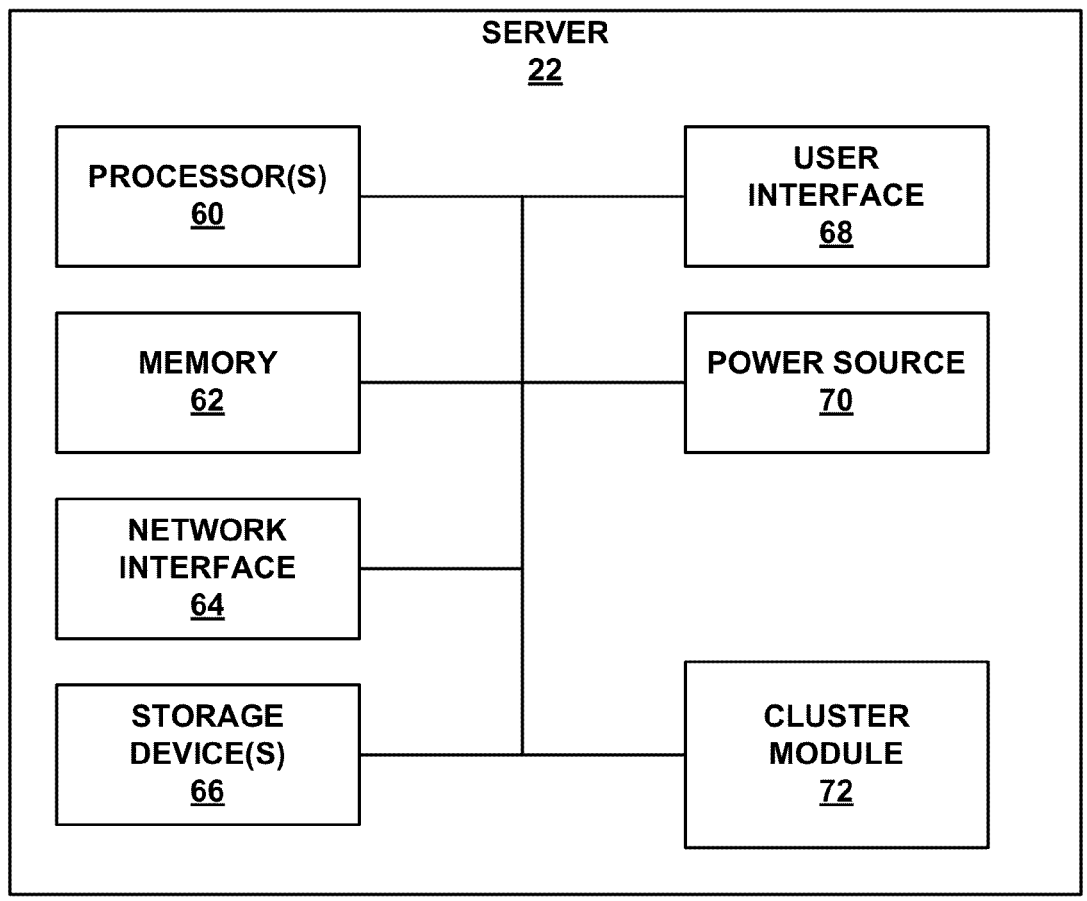
FIG. 3 is a block diagram illustrating components of one example of the server shown in FIG. 1.

FIG. 3 is a block diagram illustrating components of one example of networked server 22. FIG. 3 illustrates only one particular example of networked server 22, and many other example embodiments of networked server 22 may be used in other instances. For example, networked server 22 may include additional components, run multiple different applications, and/or include multiple different servers. In some examples, networked server 22 may include multiple servers in communication over network 20 and/or another network.

As shown in the specific example of FIG. 3, networked server 22 includes one or more processors 60, memory 62, a network interface 64, one or more storage devices 66, user interface 68, power source 70, and cluster module 72. Server 22 may also include an operating system that includes modules (e.g., cluster module 72) and/or applications that are executable by processors 60. Each of components 60, 62, 64, 66, 68, 70, and 72 may be interconnected (physically, communicatively, and/or operatively) for inter-component communications. Server 22 may also be in communication with repository 24 or even include repository 24 as one of storage devices 66.

Processors 60, in one example, are configured to implement functionality and/or process instructions for execution within server 22. For example, processors 60 may be capable of processing instructions stored in memory 62, instructions stored on storage devices 66, or instructions stored in repository 24. In some examples, one or more of processors 60 may be described as a computing device within server 22. In this manner, one or more of processors 60 may perform some or all of the functions described herein with respect to a computing device. Cluster module 72 may be a hardware and/or software module configured to perform the various functions described herein related to defining geographic regions, determining boundaries of the geographic regions, selecting geographic regions as a subset of regions for presentation to a user, and/or updating the selection of the geographic regions. Cluster module 72 may also calculate distances between computing device 14 and the reference points of each geographic region, calculate the estimated travel times to each geographic region, and/or navigation directions between computing device 14 and a selected geographic region. In other examples, processors 60 may at perform some or all of the functions of cluster module 72. Alternatively, server 22 may offload some or all of the functions of cluster module 72 to computing device 14, other networked servers, or other computing devices.

Memory 62, in one example, is configured to store information within server 22 during operation. Memory 62, in some examples, is described as a computer-readable storage medium. In some examples, memory 62 is a temporary memory, meaning that a primary purpose of memory 62 is not long-term storage. Memory 62, in some examples, is described as a volatile memory, meaning that memory 62 does not maintain stored contents when the computer is turned off. Examples of volatile memories include random access memories (RAM), dynamic random access memories (DRAM), static random access memories (SRAM), and other forms of volatile memories known in the art. In some examples, memory 62 is used to store program instructions for execution by processors 60.

Storage devices 66, in some examples, also include one or more computer-readable storage media. Storage devices 66 may be configured to store larger amounts of information than memory 62 (e.g., cluster information 28 and/or location identifiers 18). Storage devices 66 may further be configured for long-term storage of information. In some examples, storage devices 66 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories. Repository 24 may also include one or more computer-readable storage media, in some examples.

Server 22, in some examples, also includes a network interface 64 configured to communicate with other devices and transmit and/or receive data via network 20, for example. Network interface 64 may be a network interface card, such as an Ethernet card, an optical transceiver, a radio frequency transceiver, or any other type of device that can send and receive information. In alternative examples, network interface 64 may include Bluetooth, 3G, 4G, and WiFi radios in mobile computing devices as well as USB.

User interface 38 may be configured to receive input from a user (e.g., tactile, audio, or video feedback) when direct interaction with server 22 is desired. User interface 38 may include a touch-sensitive and/or a presence-sensitive screen or display, mouse, a keyboard, a voice responsive system, or any other type of device for detecting a command from a user. User interface 38 may also include, combined or separate from input devices, output devices. User interface 38 may include a speaker, a liquid crystal display (LCD), light emitting diode (LED) array, or any other type of device that can generate intelligible output to a user. Power source may include a battery and/or circuit for generating power from an AC or DC power source.

In other examples, server 22 may include additional components to perform functionality described herein. Any applications or modules (e.g., cluster module 72) implemented within or executed by networked server 22 may be implemented or contained within, operable by, executed by, and/or be operatively/communicatively coupled to components of networked server 22 (e.g., processors 60, memory 62, network interface 64, and/or storage devices 66).

Figure 4B:
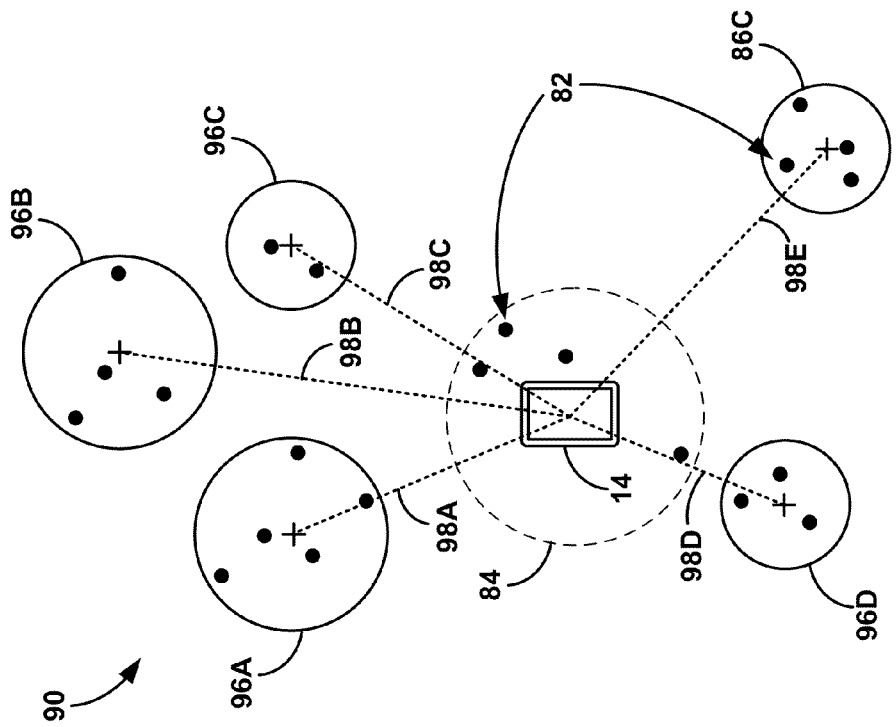
FIGS. 4A and 4B are conceptual illustrations of example geographic regions defined from location identifiers.
Figure 4A:
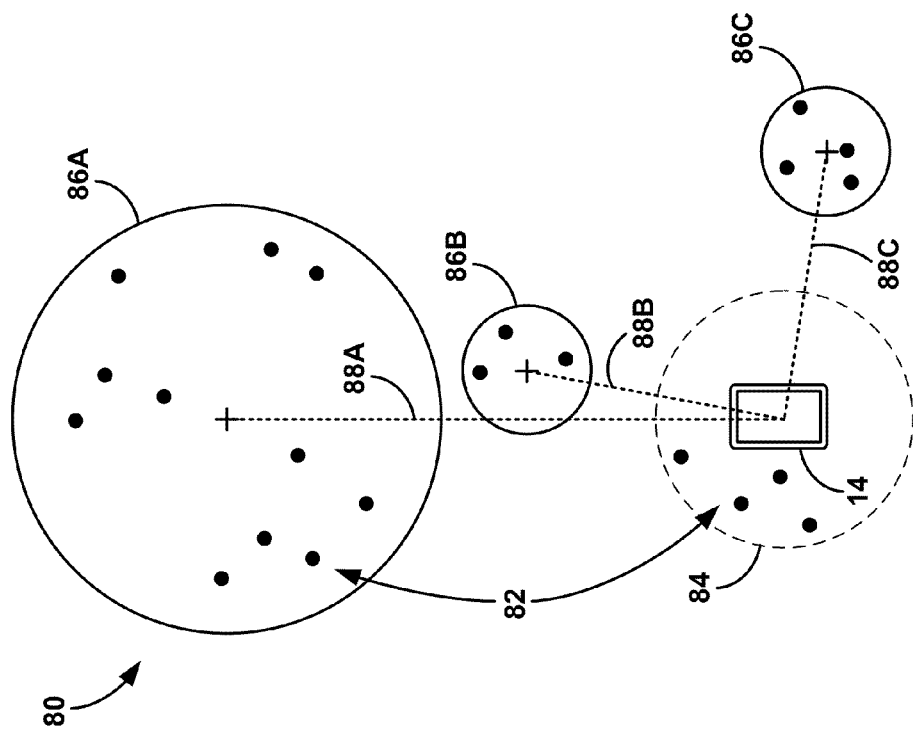

FIGS. 4A and 4B are conceptual illustrations of example geographic regions defined from location identifiers 18. The geographic regions defined and presented for FIG. 4A may be different than the geographic regions of FIG. 4B. Since computing device 14 has changed positions with respect to locations 82 (e.g., a subset of locations 16 represented by location identifiers 18), networked server 22 may select or define a different subset of geographic regions according to the updated distances between computing device 14 and locations 82 and/or the geographic regions. The geographic regions, distances, and thresholds of FIGS. 4A and 4B are conceptual and not necessarily shown to scale.

As shown in FIG. 4A, cluster information 28 may include geographic regions and/or locations. Locations 82 may be individual locations at which user 12 has previously visited. In some examples, one or more locations 82 may be suggested locations that may be of interest to user 12. Geographic regions 86A, 86B, and 86C (collectively "geographic regions 86") each may include a plurality or subset of locations 82. For each of geographic regions 86, server 22 may calculate a respective distance 88A, 88B and 88C (collectively "distances 88") between computing device 14 and the reference point within each geographic region.

As shown in FIGS. 4A and 4B, the reference points are the center points for each circular geographic region. However, the reference points may instead be a weighted center of a non-circular region, a weighted center based on the position of each location 82 within the respective region, or a representative one of locations 82 within the region. The reference point may act as a point to which distances 88 and/or navigation directions can be calculated. Although geographic regions are shown as circles, geographic regions may be defined as other shapes in other examples. For example, geographic regions 86 may be defined as ovals, squares, rectangles, other polygons, amorphous shapes, or even shapes based on political or geographic boundaries such as neighborhood, town, city, or state limits. In one example, geographic regions 86 may be defined with boundaries such that locations 82 are included and that adjacent geographic regions do not overlap.

As described herein, locations 82 within a distance threshold 84 from computing device 14 may not be included in any geographic regions. Alternatively, geographic regions with distances between computing device 14 and the reference point of each geographic region less than distance threshold 84 may not be selected for presentation to user 12. In some examples, a boundary of a geographic region that extends within distance threshold 84 may not be selected for presentation to user 12. In addition, to distance threshold 84, only those geographic regions with region metrics greater than the metric threshold (not shown) may be shown. Locations 84 not falling within a selected geographic region 86 (e.g., locations 82 within the dotted line of distance threshold 84) may or may not be presented to user 12 as an individual location.

Geographic regions 86 may be selected as a subset of a plurality of geographic regions based on their respective distances 88 to computing device 14. In addition, or alternatively, the boundaries of geographic regions 86 may be determined based on the respective distances 88 to computing device 14. Geographic region 86A has a larger size (e.g., larger radius, diameter, and/or area) than geographic regions 86B and 86C because geographic region 86A is further from computing device 14. Locations 82 within each respective geographic region 86 may be associated with that particular geographic region. In some examples, one or more locations 82 may be associated with multiple geographic regions when geographic regions at least partially overlap. Geographic region 86A is larger may be representative of a city-sized geographic region due to the magnitude of distance 88A. Geographic regions 86B and 86C may be smaller and representative of neighborhood-sized geographic regions due to the shorter distances 88B and 88C.

If computing device 14 moves (as user 12 travels or changes positions), distances 88 may change and require an update to the selected or defined geographic regions. This update may be performed to maintain relevant geographic regions for user 12. As shown in FIG. 4B, cluster information 90 includes at least some different geographic regions than cluster information 80 of FIG. 4A. It is noted that in some examples, the cluster information may not change when computing device 14 moves. Instead, the selection of geographic regions of the cluster information may simply change due to the change in distances between computing device 14 and locations 82 and/or the geographic regions.

FIG. 4B includes the same locations 82 of FIG. 4A and shows that computing device 14 has moved with respect to locations 82. The movement of computing device 14 has trigger networked server 22 to select different geographic regions for presentation to user 12. In other examples, the movement of computing device 14 may trigger networked server 22 to update the boundaries of one or more geographic regions 86. Distance threshold 84 from computing device 14 encompasses different locations 82 due to the movement of computing device 14. Since the distance 88B between computing device 14 and geographic regions 86B has dropped below the distance threshold 84, geographic region 86B is not shown. In addition, distance 88A has fallen below the distance threshold and caused networked server 22 to unselect geographic region 86A of FIG. 4A.

Instead, networked server 22 has selected different geographic regions 96A, 96B, 96C, and 96D (collectively "geographic regions 96"). Geographic regions 96A, 96B, and 96C may include the locations 82 formerly within geographic region 86A. However, geographic regions 96A, 96B, and 96C may be smaller regions to split locations 82 into more specific regions now that computing device 14 is closer to the respective locations. The smaller or more specific regions may be more useful to user 12 when the user becomes closer to the smaller regions. Geographic region 96D may include locations 82 that were previously too close to computing device 14 to be selected as a geographic region. Geographic region 86C may still be selected, although the distance 88C between computing device 14 and geographic region 86C has increased to distance 98E. Each of geographic regions 96 may be a respective distance 98A, 98B, 98C, and 98D from the reference point of the respective region.

In some examples, geographic regions may be selected based on a direction that computing device 14 is moving. Those locations 82 and/or geographic regions in the opposite direction of computing device 14 movement (e.g., geographic regions 86C and 96D) may not be selected for presentation to user 12. In some examples, these opposite direction geographic regions may still be selected only when the region is still within a predetermined distance from computing device 14. Geographic regions beyond this predetermined distance in a direction opposite from which computing device 14 may be determined as irrelevant to user 14 of computing device 14.

As shown in the transitions between the geographic regions of FIGS. 4A and 4B, networked server 22 and/or computing device 14 may select or define different geographic regions based on the distance computing device 14 is from geographic regions and/or locations 82. This updating of the selected geographic regions may be continually performed in response to detecting changing positions of computing device 14. In other examples, the selected or presented geographic regions may only be updated at preselected time intervals or upon the change in computing device position being greater than a threshold. For example, the selection of geographic regions may only be updated automatically when computing device 14 moves more than 1000 meters from the previous location at which geographic regions were selected. The selection may alternatively only be updated upon receiving a request to update from user 12. This delay in updating the geographic regions may prevent networked server 22 and/or computing device 14 from performing frequent and unnecessary updates to the geographic regions for relatively small changes in computing device movement.

In some examples, locations 82 may include all locations 16 represented by location identifiers 18 transmitted from computing device 14. In other examples, locations 82 used for defining geographic regions may only be a subset of all of the collected locations 16 or all locations 16 weighted based on certain criteria. Cluster module 72 may select locations 82 because these locations may be frequently visited by user 12 or predicted to be visited again by user 12. In other words, locations 16 may be filtered by duration of visits, frequency of visits, a number of closely positioned locations, or some other algorithm to identify those locations 82 that will be of interest to user 12 in the further.

In one example, cluster module 72 may use a leader based clustering algorithm to define each geographic region. The leader based clustering algorithm may use the distance from a particular location to the current centroid of a group of locations. For each location in the group of locations, cluster module 72 may determine whether a location belongs to an existing group by computing the distance between the location the group centroid. If the distance is below a threshold radius, the location is added to the group. If the distance is above the threshold radius, the location may not be included within or added to the group (e.g., the geographic region).

In another example, cluster module 72 may use a mean-shifting algorithm as an iterative process that moves each location to the average of the locations in its vicinity. The iterations terminate when all locations move less than a predetermined threshold. In this mean-shifting algorithm, a weighted average may be used to compute the move position of the group, where the weights are inversely proportional o the accuracy of the locations. The locations may thus gravitate towards higher accuracy locations (e.g., locations obtained by GPS coordinates) as opposed to lower accuracy locations (e.g., locations obtained by cell tower triangulation). Any of these or other algorithms may be used to define geographic regions for cluster information 28.

Figure 5:
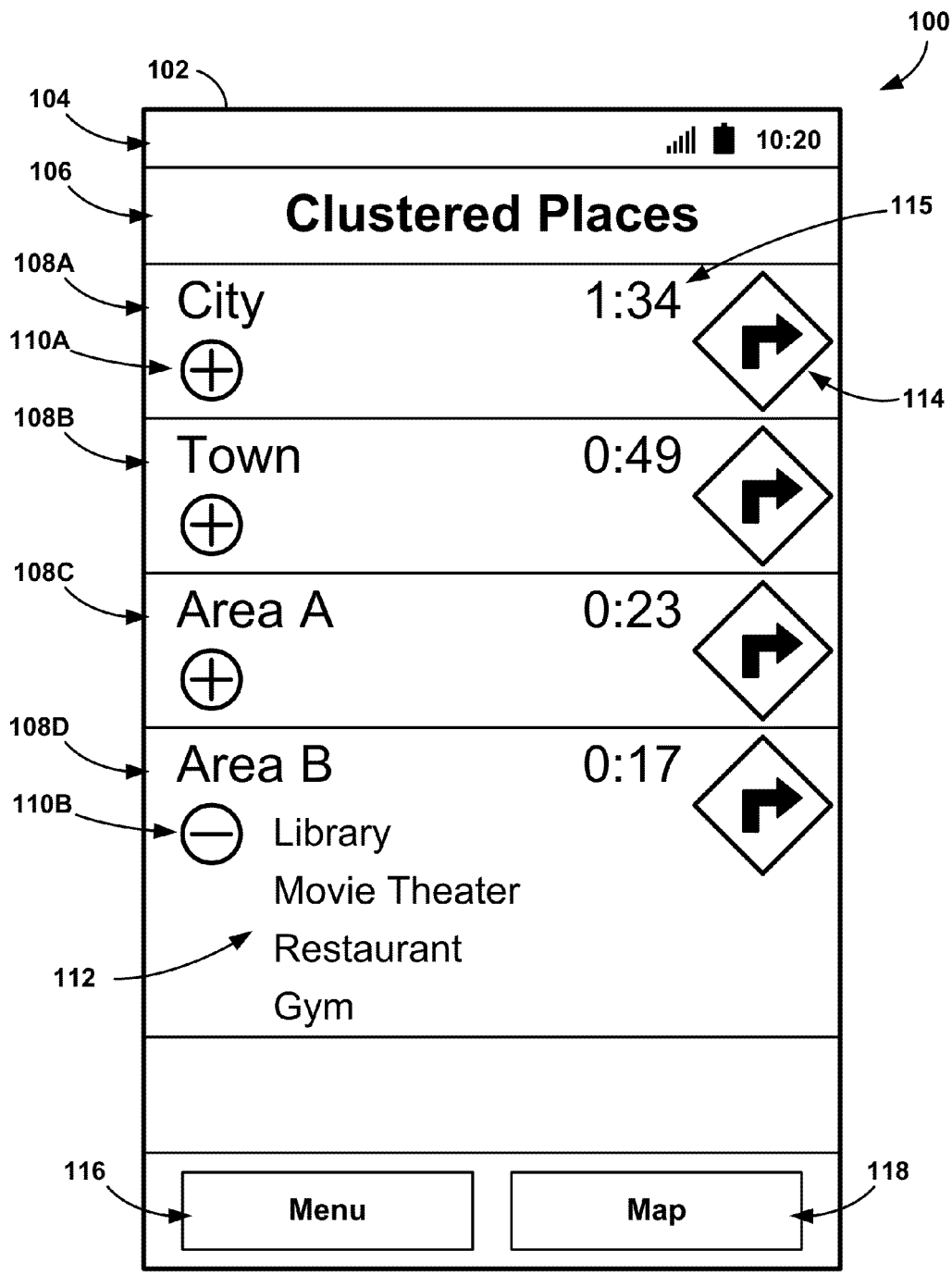
FIGS. 5 and 6 are screens of an example user interface that presents cluster information including selected geographic regions.
Figure 6:
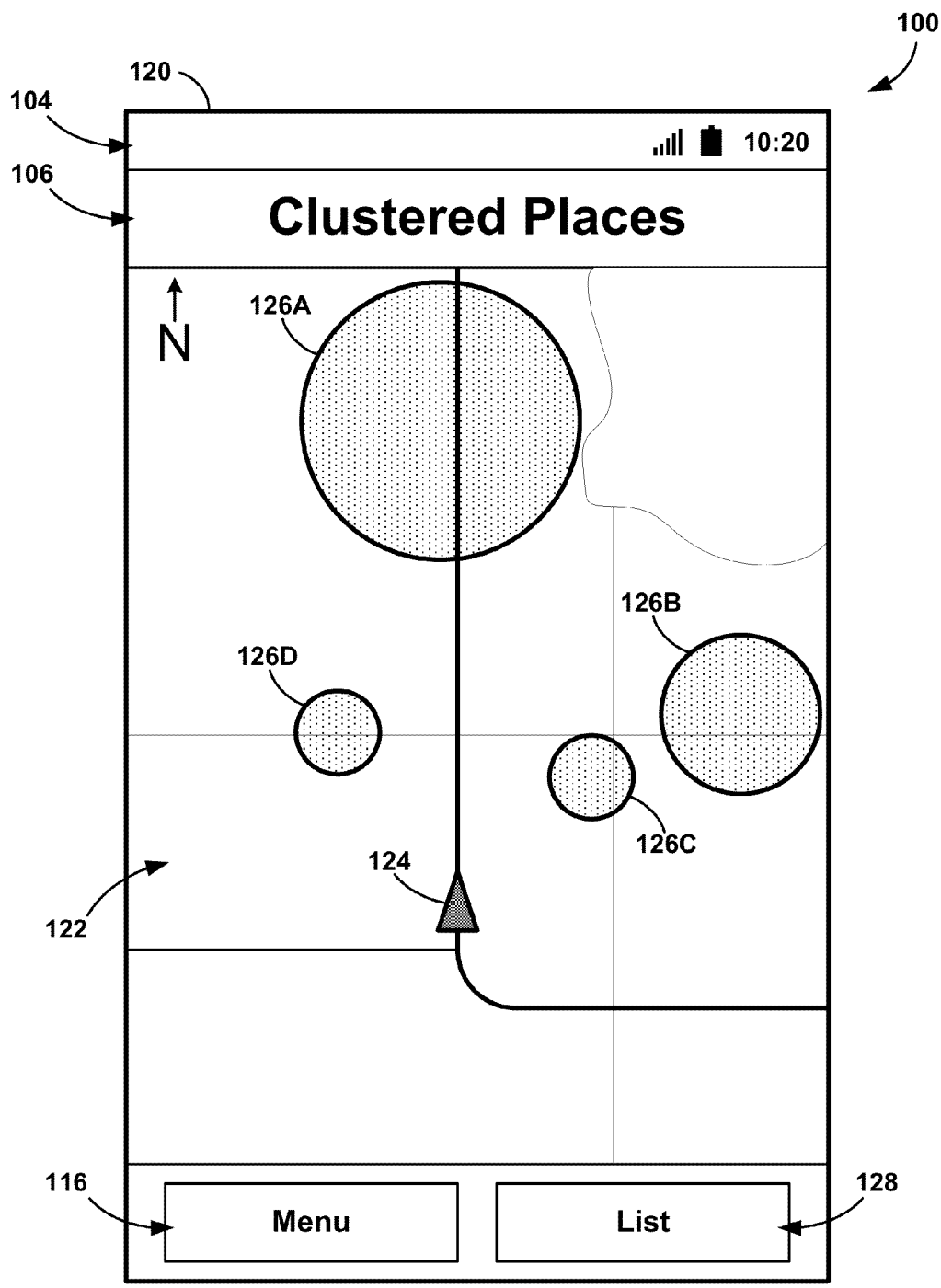

FIGS. 5 and 6 are screens of example user interface 100 of computing device 14 that presents cluster information 28 including selected geographic regions. User interface 100 may be an example of user interface 38 of computing device 14 described in FIG. 2. User interface 100 may be configured to show geographic regions in list form, graphical form, or any other visual format. User interface 100 may also receive user input with respect to the presented geographic regions.

As shown in FIG. 5, user interface 100 presents screen 102 that includes a list of selected geographic regions. Screen 102 may include header 104 that presents operation information about computing device 14 such as network signal strength, remaining battery power, and/or the time of day. Header 104 may also include additional notifications or information regarding the geographic regions and/or other applications running on computing device 14. Title bar 106 indicates that "Clustered Places" are being presented to the user. The clustered places may include geographic regions 108A, 108B, 108C, and 108D (collectively "geographic regions 108").

Each of geographic regions 108 may represent a different subset of stored locations (e.g., previously visited locations 16 and/or suggested locations). Geographic region 108A may be a city, geographic region 108B may be a town, and geographic regions 108C and 108D may be smaller areas A and B (e.g., neighborhoods or sections of a town or city). Each of geographic regions 108 may includes a respective expand button 110A. However, once expand button 110A is selected, individual locations 112 included within the geographic region may be presented to the user. As shown in screen 102, expand button 110A has been selected for geographic region 108D to present the locations 112 within the boundary of the geographic region (i.e., Area B). Locations 112 may include such destinations as a library, movie theater, restaurant, gym, or any other destinations in which user 12 has previously visited or may be interested in visiting. Once expand button 110A is selected, the button converts into contract button 110B. Selection of contract button 110B may again hide individual locations 112.

Each of geographic regions 108 may provide additional information and/or features to user 12. For example, each geographic region 108 may include an estimated travel time 115. Estimated travel time 115 may be the estimated time that it would take user 12 to travel to the respective geographic region 108. Estimated travel time 115 is shown in hours and minutes, but any other time format (e.g., seconds, minutes, or hours) may be used instead. In addition or alternatively, each geographic region 108 may provide a distance between computing device 14 and the region. The estimated travel time 115 and the distance may be determined using a reference point for each respective geographic region.

Screen 102 may also provide navigation input 114 for each presented geographic region 108. Navigation input 114 may be a button or other selectable icon that, when selected, requests navigation directions for computing device 14 to the reference point of the associated geographic region 108. In response to receiving the selection of navigation input 114, computing device 14 and/or networked server 22 may generate navigation directions and present the direction to the user using user interface 100.

If more geographic regions are listed than fit within screen 102, user interface 100 may also include a scroll bar or otherwise accept scroll input that allows the user to browse the geographic regions in the list. Geographic regions 108 may be organized with the larger regions first, with smaller regions first, with the regions in alphabetical order, or even according to a predicted region interest to the user. For example, geographic regions with more frequently visited locations may be listed before regions with less frequently visited locations. Menu button 116 may be selected by the user to return to a menu listing additional actions or functions. Map button 118 may be selected to view geographic regions 108 in graphical format instead of the list format of screen 102, such as screen 120 of FIG. 6.

As shown in FIG. 6, user interface 100 may present screen 120 that includes header 104, title bar 106, and interactive map 122. Map 122 may include geographic regions 126A, 126B, 126C, and 126D (collectively "geographic regions 126"). Geographic regions 126A, 126B, 126C, and 126D may be the graphical form of respective geographic regions 108A, 108B, 108C, and 108D of FIG. 5. User icon 124 may represent the position of computing device 14 and user 12 within map 122. Menu button 116 may be selected by the user to return to a menu listing additional actions or functions. List button 128 may be selected to view geographic regions 126 in the textual format of FIG. 5 instead of the graphical format of screen 120.

Geographic regions 126 may be presented over or within other features of map 122. For example, geographic regions 126 may be placed over roads or destinations to outline each of the selectable regions. In some example, geographic regions 126 may be opaque and in other examples geographic regions 126 may be at least partially transparent to show other features of map 122. Each of geographic regions 126 may be selectable to view additional information associated with the selected region, obtain navigation directions to the selected geographic region, or perform some other functions. In one example, user 12 may select one of geographic regions 126 and a pop-up window or other area of screen 120 may be presented display the estimated travel time to the region, the distance to the region, and/or locations within the region. In another example, selection of one of geographic regions 126 may show, or unhide, individual locations within the region. Alternatively, or in addition, selection of one of geographic regions 126 may request navigation directions to the selected region.

Although only four geographic regions 126 are shown in map 122 of screen 120, the user may view additional regions if such regions have been selected for presentation to user 12. The user may provide a drag into to map 122 that drags map 122 to the left, right, up, down, or in any other direction. Such movement of map 122 may expose additional regions. In addition, user interface 100 may receive tapping or multi-touch input that zooms in or out of map 122 to view more or less of map 122. As user 12 moves with computing device 14, computing device 14 may update the position of user icon 124 within map 122. In addition, as described herein, the selected geographic regions for presentation on map 122 may change with computing device 14 movement. Therefore, user interface 100 may update the geographic regions 126 shown on map 122 if the changing distances between computing device 14 and respective geographic regions cause different geographic regions to be selected and presented on screen 120. In this manner, the user may view one or more geographic regions 126 changing with changes in user position.

The graphical representations of geographic regions 126 provided in FIG. 6 are one example. Alternative user interfaces may represent the geographic regions using different shapes, different colors, different shading, or even text over map 122. In any case, geographic regions may be presented on a map or some representation of the area in which locations of the geographic regions are positioned.

Figure 7:
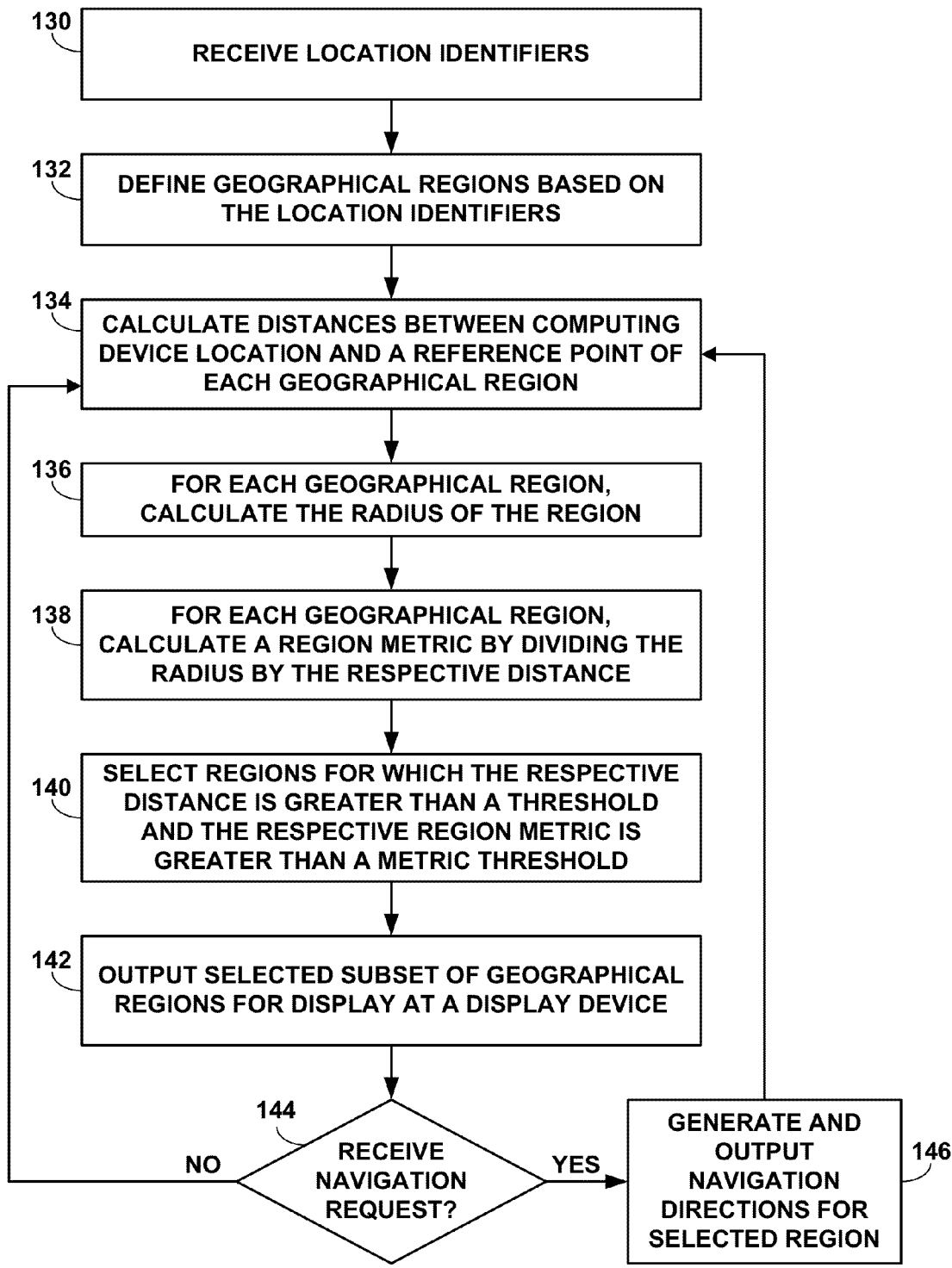
FIG. 7 is a flow diagram illustrating an example process that may be performed by a server to select geographic regions based on a distance between a computing device and the geographic regions.

FIG. 7 is a flow diagram illustrating an example process that may be performed by server 22 to select geographic regions based on a distance between a location of computing device 14 and the geographic regions. For purposes of illustration only, cluster module 72 of networked server 22 will be described as performing the process of FIG. 7. However, in some examples, cluster module 72 may include one or more processors and cluster module 72 may be controlled by one or more software applications and associated modules. In other examples, one or more steps of the process may be performed by other devices, such as cluster module 50 of computing device 14.

As shown in FIG. 7, the process may begin with cluster module 72 receiving location identifiers 18 from computing device 14 and/or other computing device associated with user 12 (130). Cluster module 72 may store location identifiers 18 in repository 24 or another storage device for later use in defining geographic regions. Cluster module 72 may then define geographic regions based on stored location identifiers 18 (132). The geographic regions may act to group two or more of the location identifiers within each geographic region.

Cluster module 72 may then calculate the distances between the current location of computing device 14 and a reference point within each geographic region (134). The distances may be calculated using the detected position of computing device 14, provided by computing device 14 to server 22. Cluster module 72 may also calculate the radius if each of the geographic regions (136). If the geographic regions are not circular in shape, a different measure of the size of the region (e.g., circumference, cross-sectional distance, or area) may be used. Cluster module 72 may then calculate a region metric for each of the geographic regions by dividing the radius of the region by the respective distance between the current location of computing device 14 and the reference point within the region (138). The calculated region metric may be used, at least in part, to select which geographic regions will be included in the subset of geographic regions presented to user 12.

Cluster module 72 may select the geographic regions for which the respective distance is greater than the distance threshold and the respective region metric is greater than a metric threshold (140). Limiting selection of geographic regions to both of these criteria may eliminate geographic regions too close to computing device 14 and geographic regions that are small and too far away from computing device 14. In other words, the distance threshold and the metric threshold may be used to identify geographic regions relevant to the information of interest to user 12. Cluster module 72 may output the selected subset of geographic regions for display at a display device (142). For example, cluster module 72 may output the selected subset of geographic regions for display at a display device (e.g., a presence-sensitive display device or a display device) of computing device 14. In some examples, cluster module 72 may be configured to select the geographic regions using only one of the criteria (e.g., the distance threshold or the metric threshold).

Responsive to receiving a navigation request from computing device 14 ("YES" branch of block 144), cluster module 72 may generate and output navigation directions for computing device 14 to the selected region (146). Cluster module 72 may then calculate updated distances when computing device 14 has moved (134). If cluster module 72 has not received a request for navigation directions ("NO" branch of block 144). Cluster module 72 may calculate updated distances when computing device 14 has moved (134). As described herein, in other examples, cluster module 72 may wait a predetermined amount of time or for the movement of computing device 14 to exceed a predetermined threshold before updating the distances and the selected subset of geographic regions.

Figure 8:
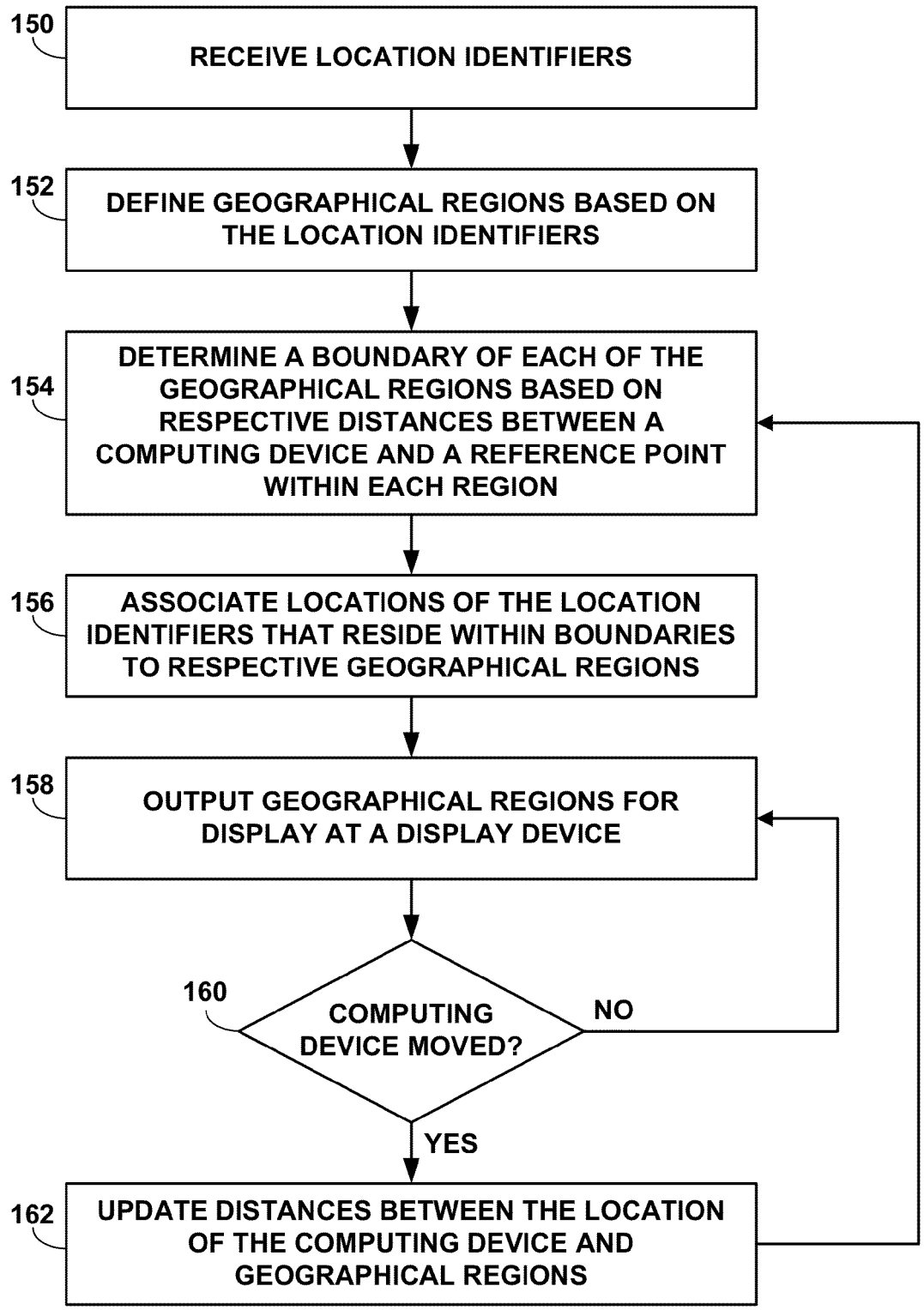
FIG. 8 is a flow diagram illustrating an example process that may be performed by a server to define geographic regions based on a distance between a computing device and locations of received location identifiers.

FIG. 8 is a flow diagram illustrating an example process that may be performed by networked server 22 to define geographic regions based on a distance between a current location of computing device 14 and locations of received location identifiers 18. For purposes of illustration only, cluster module 72 of networked server 22 will be described as performing the process of FIG. 8. However, in some examples, cluster module 72 may include one or more processors and cluster module 72 may be controlled by one or more software applications and associated modules. In other examples, one or more steps of the process may be performed by other devices, such as cluster module 50 and/or processors 30 of computing device 14.

As shown in FIG. 8, the process may begin with cluster module 72 receiving location identifiers 18 from computing device 14 and/or other computing device associated with user 12 (150). Cluster module 72 may store location identifiers 18 in repository 24 or another storage device for later use in defining geographic regions. Cluster module 72 may then define geographic regions based on stored location identifiers 18 (152). The definition of geographic regions may include defining an incomplete region or modifiable region based on the distances from the current location of computing device 14. In other examples, the following step of determining the boundary of each of the regions may be performed as a part of defining the regions.

Cluster module 72 may then determine the boundary of each of the geographic regions based on the respective distances between computing device 14 and the reference point within each region (154). Determining the boundary of each region may include calculating a radius, diameter, or even an amorphous boundary for the region. The boundary may be determined to include two or more locations of the location identifiers and/or suggested locations. In one example, cluster module 72 may use a ratio of region radius to distance between the region and the current location of computing device 14 to determine the boundary of each region. For example, the ratio may be set to approximately 1:5 or 0.2. In other words, for a distance of 100 kilometers (km) between the geographic region and computing device 14, the radius of the geographic region boundary may be set at approximately 20 km. In some examples, the ratio may be set to within a certain range to accommodate various positions of locations.

In other examples, cluster module 72 may group locations in relatively close proximity to each other as one geographic region. An area of the geographic region may need to be within a certain ratio of the distance between the location of computing device 14 and the region (e.g., larger distances may allow for greater areas within the boundary). Cluster module 72 may thus set the boundary such that the area within the boundary falls within the allowable ratio of area to distance. If the area is too large for the distance, cluster module 72 may split the region into multiple geographic regions and set each respective boundary. If the area is too small for the distance, cluster module 72 may increase the boundary radius or area of the geographic region. This increase in geographic region area may encompass additional locations.

Once cluster module 72 has determined the boundaries for each geographic region, cluster module 72 may associate the locations of the location identifiers that reside within the boundaries to the respective geographic regions (156). Cluster module 72 may then output the selected geographic regions for display (e.g., presentation) at a display device (e.g., a presence-sensitive display device of computing device 14) (158). If cluster module 72 does not receive an indication that computing device 14 has moved to a new location ("NO" branch of block 160), cluster module 72 may continue to output the geographic regions. In response to cluster module 72 receiving an indication that computing device 14 has moved to a new location ("YES" branch of block 160), cluster module 72 may then update the distances between the updated location of computing device 14 and each geographic region (162). Cluster module 72 may then again determine the boundaries of each geographic region based on the updated distances (154). As described herein, in other examples, cluster module 72 may wait a predetermined amount of time or for the movement of computing device 14 to exceed a predetermined threshold before updating the distances and the selected subset of geographic regions.

Figure 9:
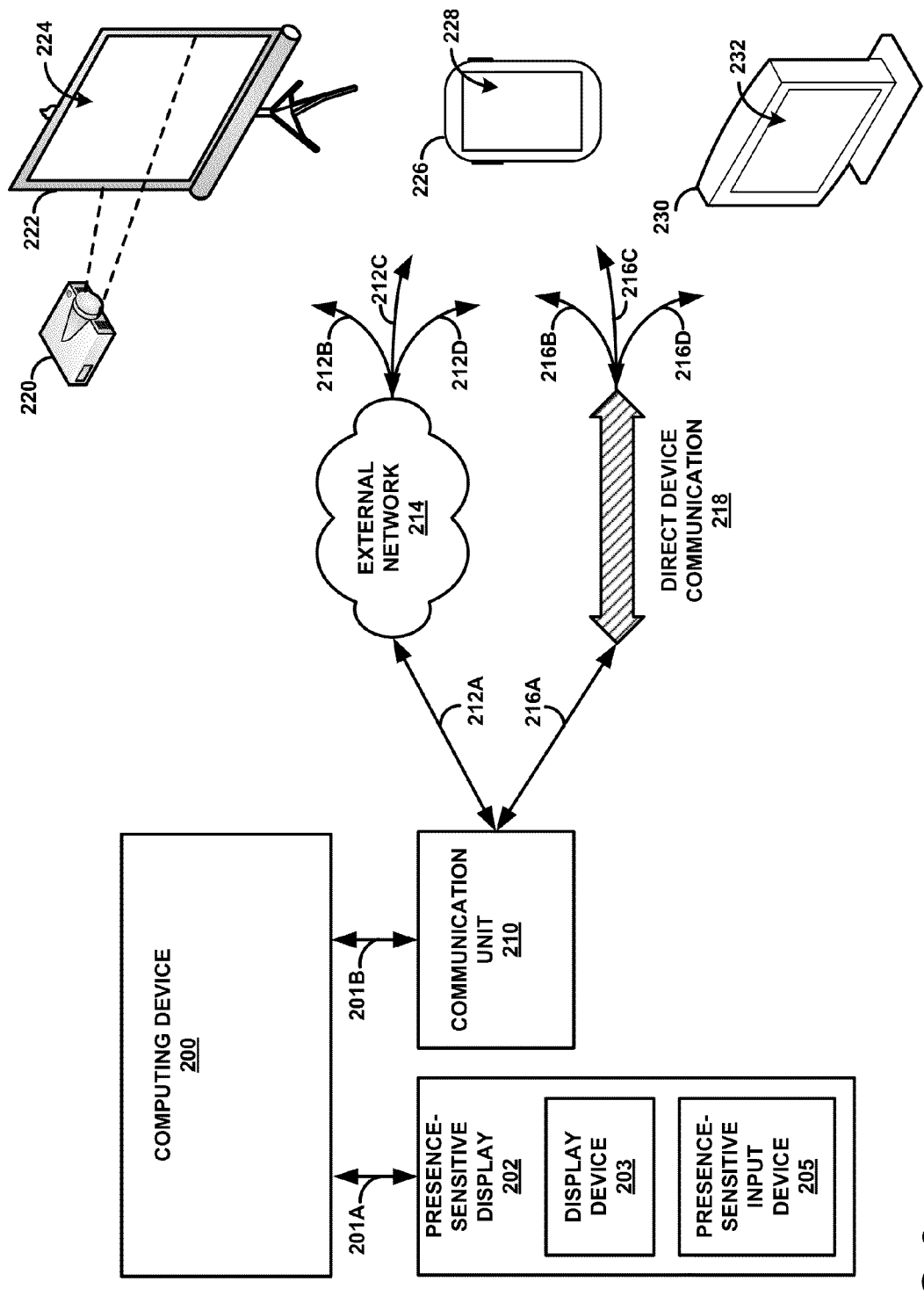
FIG. 9 is a block diagram illustrating an example computing device that outputs graphical content for display at a remote device.

FIG. 9 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 9 includes a computing device 200, presence-sensitive display 202, communication unit 210, projector 220, projector screen 222, tablet device 226, and visual display device 230. Although shown for purposes of example in FIGS. 1 and 2 as a stand-alone computing device 14, a computing device may, generally, be any component or system that includes a processor or other suitable computing environment for executing software instructions and, for example, need not include a presence-sensitive display.

As shown in the example of FIG. 9, computing device 200 may be one or more processors that includes functionality as described with respect to processor 30 and/or computing device 14 of FIG. 2. In such examples, computing device 200 may be operatively coupled to presence-sensitive display 202 by a communication channel 201A, which may be a system bus or other suitable connection. Computing device 200 may also be operatively coupled to communication unit 210, further described below, by a communication channel 201B, which may also be a system bus or other suitable connection. Although shown separately as an example in FIG. 9, computing device 200 may be operatively coupled to presence-sensitive display 202 and communication unit 210 by any number of one or more communication channels.

In other examples, such as illustrated previously in FIGS. 1-2 with regard to computing device 14, computing device 200 may be configured as a portable or mobile device such as mobile phones (including smart phones), laptop computers, etc. In some examples, computing device 200 may be a desktop computers, tablet computers, smart television platforms, cameras, personal digital assistants (PDAs), servers, mainframes, etc.

Presence-sensitive display 202, as shown in FIG. 9, may include display device 203 and presence-sensitive input device 205. Display device 203 may, for example, receive data from computing device 200 and display the graphical content. In some examples, presence-sensitive input device 205 may determine one or more user inputs (e.g., continuous gestures, multi-touch gestures, single-touch gestures, etc.) at presence-sensitive display 202 using capacitive, inductive, and/or optical recognition techniques and send indications of such user input to computing device 200 using communication channel 201A. In some examples, presence-sensitive input device 205 may be physically positioned on top of display device 203 such that, when a user positions an input unit over a graphical element displayed by display device 203, the location at which presence-sensitive input device 205 corresponds to the location of display device 203 at which the graphical element is displayed. In other examples, display device 203 and presence-sensitive input device 25 may be separate devices that are not combined into a single device such as presence-sensitive display 202.

As shown in FIG. 9, computing device 200 may also include and/or be operatively coupled with communication unit 210. Communication unit 210 may include functionality of network interface 34 as described in FIG. 2. Examples of communication unit 210 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 200 may also include and/or be operatively coupled with one or more other devices, e.g., input devices, output devices, memory, storage devices, etc. that are not shown in FIG. 9 for purposes of brevity and illustration.

FIG. 9 also illustrates a projector 220 and projector screen 222. Other such examples of projection devices may include electronic whiteboards, holographic display devices, and any other suitable devices for displaying graphical content. Projector 220 and project screen 222 may include one or more communication units that enable the respective devices to communicate with computing device 200. In some examples, the one or more communication units may enable communication between projector 220 and projector screen 222. Projector 220 may receive data from computing device 200 that includes graphical content. Projector 220, in response to receiving the data, may project the graphical content onto projector screen 222. In some examples, projector 220 may determine one or more user inputs (e.g., continuous gestures, multi-touch gestures, single-touch gestures, etc.) at projector screen using optical recognition or other suitable techniques and send indications of such user input using one or more communication units to computing device 200.

Projector screen 222, in some examples, may include a presence-sensitive display 224. Presence-sensitive display 224 may include a subset of functionality or all of the functionality of user interface 38 as described in this disclosure. In some examples, presence-sensitive display 224 may include additional functionality. Projector screen 222 (e.g., an electronic whiteboard), may receive data from computing device 200 and display the graphical content. In some examples, presence-sensitive display 224 may determine one or more user inputs (e.g., continuous gestures, multi-touch gestures, single-touch gestures, etc.) at projector screen 222 using capacitive, inductive, and/or optical recognition techniques and send indications of such user input using one or more communication units to computing device 200.

FIG. 9 also illustrates tablet device 226 and visual display device 230. Tablet device 226 and visual display device 230 may each include computing and connectivity capabilities. Examples of tablet device 226 may include e-reader devices, convertible notebook devices, hybrid slate devices, etc. Examples of visual display device 230 may include televisions, computer monitors, etc. As shown in FIG. 9, tablet device 226 may include a presence-sensitive display 228. Visual display device 230 may include a presence-sensitive display 232. Presence-sensitive displays 228, 232 may include a subset of functionality or all of the functionality of user interface 38 as described in this disclosure. In some examples, presence-sensitive displays 228, 232 may include additional functionality. In any case, presence-sensitive display 232, for example, may receive data from computing device 200 and display the graphical content. In some examples, presence-sensitive display 232 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 200.

As described above, in some examples, computing device 200 may output graphical content for display at presence-sensitive display 202 that is coupled to computing device 200 by a system bus or other suitable communication channel. Computing device 200 may also output graphical content for display at one or more remote devices, such as projector 220, projector screen 222, tablet device 226, and visual display device 230. For instance, computing device 200 may execute one or more instructions to generate and/or modify graphical content in accordance with techniques of the present disclosure. Computing device 200 may output the data that includes the graphical content to a communication unit of computing device 200, such as communication unit 210. Communication unit 210 may send the data to one or more of the remote devices, such as projector 220, projector screen 222, tablet device 226, and/or visual display device 230. In this way, computing device 200 may output the graphical content for display at one or more of the remote devices. In some examples, one or more of the remote devices may output the graphical content at a presence-sensitive display that is included in and/or operatively coupled to the respective remote devices.

In some examples, computing device 200 may output graphical content at presence-sensitive display 202 that is operatively coupled to computing device 200. In other examples, computing device 200 may output graphical content for display at both a presence-sensitive display 202 that is coupled to computing device 200 by communication channel 201A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 200 and output for display at presence-sensitive display 202 may be different than graphical content display output for display at one or more remote devices.

Computing device 200 may send and receive data using any suitable communication techniques. For example, computing device 200 may be operatively coupled to external network 214 using network link 212A. Each of the remote devices illustrated in FIG. 9 may be operatively coupled to network external network 214 by one of respective network links 212B, 212C, and 212D. External network 214 may include network hubs, network switches, network routers, etc., that are operatively inter-coupled thereby providing for the exchange of information between computing device 200 and the remote devices illustrated in FIG. 9. In some examples, network links 212A-212D may be Ethernet, ATM or other network connections. Such connections may be wireless and/or wired connections.

In some examples, computing device 200 may be operatively coupled to one or more of the remote devices included in FIG. 9 using direct device communication 218. Direct device communication 218 may include communications through which computing device 200 sends and receives data directly with a remote device, using wired or wireless communication. That is, in some examples of direct device communication 218, data sent by computing device 200 may not be forwarded by one or more additional devices before being received at the remote device, and vice-versa. Examples of direct device communication 218 may include Bluetooth, Near-Field Communication, Universal Serial Bus, WiFi, infrared, etc. One or more of the remote devices illustrated in FIG. 9 may be operatively coupled with computing device 200 by communication links 216A-216D. In some examples, communication links 212A-212D may be connections using Bluetooth, Near-Field Communication, Universal Serial Bus, infrared, etc. Such connections may be wireless and/or wired connections.

In accordance with the techniques, devices, and systems of this disclosure, computing device 200 may be operatively coupled to visual display device 230 using external network 214 in some examples. In one example, a computing device (e.g., a networked server) may be configured to receive a plurality of location identifiers corresponding to a plurality of locations at which computing device 200 (e.g., a mobile computing device) was previously located. The networked server may also be configured to define a plurality of geographic regions based at least in part on the plurality of location identifiers, wherein each of the plurality of geographic regions defines a physical area in which at least one of the plurality of locations is located and selecting a subset of the plurality of geographic regions based on respective distances between a current location of the mobile computing device and a respective reference point within each of the geographic regions. Computing device 200 may be configured to output, for display at presence-sensitive display 232, an indication of the subset of the plurality of geographic regions. In other examples, computing device 200 may be configured to output the indication of the subset of the plurality of geographic regions at other devices such as presence-sensitive display 202 and/or presence-sensitive display 228. In this manner, computing device 200 may be configured to output any content for display at any device in communication with computing device 200. In this fashion, computing device 200 may use any of the devices and communication protocols of FIG. 9 to implement any of the techniques described herein.

In one example, a method includes receiving, at a computing device, a plurality of location identifiers corresponding to a plurality of locations at which a mobile computing device associated with a user was previously located, defining, by the computing device, a plurality of geographic regions based at least in part on the plurality of location identifiers, wherein each of the plurality of geographic regions comprises at least one of the plurality of locations, selecting, by the computing device, at least a subset of the plurality of geographic regions based on respective distances between the mobile computing device associated with the user and a reference point within each of the geographic regions, and outputting the subset of the plurality of geographic regions for presentation at a display of the computing device. In some examples, the plurality of location identifiers may be a first plurality of location identifiers, and the method may include receiving a second plurality of location identifiers corresponding to a plurality of locations at which one or more additional mobile computing devices associated with the user was previously located and defining the plurality of geographic regions based on the first and second pluralities of location identifiers.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. In some examples, the functions of units, modules, or components may also be distributed between components of multiple devices or systems. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Example computer-readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media or any other computer readable storage device or tangible computer readable medium.

In some examples, a computer-readable storage medium may comprise non-transitory medium. The term "non-transitory" may indicate that the storage medium is not embodied in a carrier wave or a propagated signal. In certain examples, a non-transitory storage medium may store data that can, over time, change (e.g., in RAM or cache).

Various aspects of the disclosure have been described. These and other embodiments are within the scope of the following claims.

What is claimed is:
1. A method comprising:
receiving, at a computing device, a plurality of location identifiers, each location identifier of the plurality of location identifiers corresponding to a respective location of a plurality of locations;

defining, by the computing device and based at least in part on the plurality of location identifiers, a plurality of geographic regions, wherein each geographic region of the plurality of geographic regions includes at least one respective location identifier of the plurality of location identifiers, and wherein each location of the plurality of locations is located within one or more respective geographic regions of the plurality of geographic regions;

determining, by the computing device and based on respective distances between a current location of a mobile computing device and respective reference points within each respective geographic region of the plurality of geographic regions, a subset of the plurality of geographic regions, wherein the subset comprises a first set of one or more geographic regions and a second set of one or more geographic regions, wherein:

each geographic region of the first set is smaller than each geographic region of the second set, and the one or more geographic regions of the first set are included in the first set based on respective distances between the current location and first respective reference points of the geographic regions of the first set being smaller than respective distances between the current location and second respective reference points of the geographic regions of the second set; and outputting, by the computing device and for display, an indication of the subset of the plurality of geographic regions.

2. The method of claim 1, wherein the plurality of locations comprises predicted locations of interest to a user associated with the mobile computing device.

3. The method of claim 2, wherein at least one of the predicted locations is based on a map search.

4. The method of claim 2, wherein at least one of the predicted locations is based on an internet site visited by the user.

5. The method of claim 2, wherein at least one of the predicted locations is based on search information from the user for a search engine.

6. The method of claim 1, further comprising outputting, by the computing device and for display, at least one of graphical or textual representations of the subset of the plurality of geographic regions.

7. The method of claim 1, further comprising:

calculating an estimated travel time based on the respective distances between the current location of the mobile computing device and the respective reference points within each of the geographic regions of the subset and travel delay information associated with a travel path between the current location of the mobile computing device and the respective reference points; and outputting, by the computing device and for display, an indication of the estimated travel time for each of the geographic regions of the subset.

8. The method of claim 1, wherein the subset of the plurality of geographic regions is a first subset of the plurality of geographic regions, and wherein the method further comprises:

determining that the respective distances between the current location of the mobile computing device and the plurality of geographic regions have changed;

calculating updated distances between an updated location of the mobile computing device and respective reference points within each respective geographic region of the plurality of geographic regions;

determining a second subset of the plurality of geographic regions based on the updated distances between the updated location of the mobile computing device and the respective reference points within each respective geographical region of the plurality of geographic regions, wherein determining the second subset of the plurality of geographic regions further comprises determining a third set of one or more geographic regions and a fourth set of one or more geographical regions, wherein:

each geographic region of the third set are smaller than each geographic region of the fourth set, and the one or more geographic regions of the third set are included in the third set based on respective distances between the updated location and third respective reference points of the geographic regions of the third set being smaller than respective distances between the updated location and fourth respective reference points of the geographic regions of the fourth set; and outputting, by the computing device and for display, the second subset of the plurality of geographic regions.

9. The method of claim 1, wherein determining the subset of the geographic regions comprises:

comparing distances between the current location of the mobile computing device and the respective reference points within each respective geographic region of the plurality of geographic regions to a threshold; and determining, for the subset, geographic regions having respective distances greater than the threshold.

10. The method of claim 9, further comprising:

identifying geographic regions having respective distances less than the threshold; and outputting, by the computing device and for display, individual location identifiers located within the identified geographic regions.

11. The method of claim 9, wherein determining the subset of the geographic regions comprises:

for each geographic region of the plurality of geographic regions, calculating a radius of the geographic region;

for each geographic region of the plurality of geographic regions, calculating a region metric by dividing the radius of the geographic region by the respective distance between the current location of the mobile computing device and the respective reference point within the geographic region;

comparing the region metric to a metric threshold; and determining, for the subset, geographic regions with the respective region metric greater than the metric threshold.

12. The method of claim 1, wherein:

defining the plurality of geographic regions comprises determining a boundary of each of the respective geographic regions based at least in part on respective distances between the current location of the mobile computing device and the respective reference point within each of the geographic regions, the method further comprises associating at least one location of the plurality of locations with a respective one of the geographic regions, the at least one location is within the boundary of the respective geographic region, and respective sizes of the plurality of the geographic regions decrease with decreasing distance between an updated location of the mobile computing device and the plurality of geographic regions.

13. The method of claim 12, further comprising:

determining that the distances between the current location of the mobile computing device and the plurality of geographic regions has changed;

calculating updated distances between an updated location of the mobile computing device and each geographic region of the plurality of geographic regions;

updating, based on the updated distances, at least one of the size of at least one of the plurality of geographic regions and a number of the plurality of geographic regions; and associating locations within each updated geographic region of the plurality of updated geographic regions with the respective updated geographic region.

14. The method of claim 1, wherein defining the plurality of geographic regions comprises defining, based on a respective location of at least one suggested destination, at least one of the geographic regions, and wherein the at least one suggested destination is based on at least some of the plurality of locations.

15. The method of claim 1, wherein the computing device comprises a networked server.

16. The method of claim 1, wherein the computing device comprises one or more processors, and wherein the mobile computing device comprises the computing device.

17. A computing device comprising:
one or more processors; and
a cluster module operable by the one or more processors to:
  receive a plurality of location identifiers, each location identifier of the plurality of location identifiers corresponding to a respective location of a plurality of locations;
  define, based at least in part on the plurality of location identifies, a plurality of geographic regions, wherein each geographic region of the plurality of geographic regions includes at least one respective location identifier of the plurality of location identifiers, and wherein each location of the plurality of locations is located within one or more respective geographic regions of the plurality of geographic regions;
  determine respective distances between a current location of the mobile computing device and respective reference points within each geographic region of the plurality of geographic regions;
  compare the respective distances between the current location of the mobile computing device and each of the respective reference points to a threshold;
  determine a subset of the plurality of geographic regions, wherein the respective distances of each geographic region of the subset are greater than the threshold, wherein the subset comprises a first set of one or more geographic regions and a second set of one or more geographic regions, wherein:
    each geographic region of the first set is smaller than each geographic region of the second set, and
    the one or more geographic regions of the first set are included in the first set based on the respective distances between the current location and first respective reference points of the geographic regions of the first set being smaller than respective distances between the current location and second respective reference points of the geographic regions of the second; and output, for display at a display device, the subset of the plurality of geographic regions.

18. The computing device of claim 17, wherein the plurality of locations comprises predicted locations of interest to a user associated with the mobile computing device, and wherein at least one of the predicted locations is based on search information from the user for a search engine.

19. The computing device of claim 18, wherein the cluster module is operable by the one or more processors to:
for each geographic region of the plurality of geographic regions, calculate a radius of the geographic region;
for each geographic region of the plurality of geographic regions, calculate a region metric by dividing the radius of the geographic region by the respective distance between the current location of the mobile computing device and the respective reference point within the geographic region;
compare the region metric to a metric threshold; and
determine, for the subset, geographic regions with the respective region metric greater than the metric threshold.

20. A computer-readable storage medium encoded with instructions that, when executed, cause one or more processors to:
receive a plurality of location identifiers, each location identifier of the plurality of location identifiers corresponding to a respective location of a plurality of locations, and the plurality of locations comprising predicted locations of interest to a user associated with a mobile computing device;
define, based at least in part on the plurality of location identifiers, a plurality of geographic regions, wherein each geographic region of the plurality of geographic regions includes at least one respective location identifier of the plurality of location identifiers, and wherein each location of the plurality of locations is located within one or more respective geographic regions of the plurality of geographic regions;
determine, based on respective distances between a current location of the mobile computing device and respective reference points within each respective geographic region of the plurality of geographic regions, a subset of the plurality of geographic regions, wherein the subset comprises a first set of one or more geographic regions and a second set of one or more geographic regions, wherein:
each geographic region of the first set is smaller than each geographic region of the second set, and
the one or more geographic regions of the first set are included in the first set based on respective distances between the current location and first respective reference points of the geographic regions of the first set being smaller than respective distances between the current location and second respective reference points of the geographic regions of the second set; and
output, for display, an indication of the subset of the plurality of geographic regions.

* * * * *